(12) United States Patent
Iwase et al.

(10) Patent No.: US 9,447,864 B2
(45) Date of Patent: Sep. 20, 2016

(54) VEHICLE DRIVE DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Mikio Iwase, Anjo (JP); Daiki Suyama, Okazaki (JP); Naoya Jinnai, Anjo (JP); Tatsuya Okishima, Chiryu (JP); Masahiro Izuhara, Okazaki (JP); Kensuke Wada, Anjo (JP); Yukihiko Ideshio, Nissin (JP); Yuji Inoue, Nissin (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 14/240,279

(22) PCT Filed: Oct. 30, 2012

(86) PCT No.: PCT/JP2012/078020
§ 371 (c)(1),
(2) Date: Feb. 21, 2014

(87) PCT Pub. No.: WO2013/065677
PCT Pub. Date: May 10, 2013

(65) Prior Publication Data
US 2014/0231174 A1    Aug. 21, 2014

(30) Foreign Application Priority Data

Nov. 4, 2011 (JP) .................................. 2011-242915

(51) Int. Cl.
*F16H 57/04* (2010.01)
*B60K 6/405* (2007.10)
*B60K 6/48* (2007.10)

(52) U.S. Cl.
CPC ........... *F16H 57/0436* (2013.01); *B60K 6/405* (2013.01); *B60K 6/48* (2013.01); *F16H 57/045* (2013.01); *F16H 57/0409* (2013.01); *F16H 57/0476* (2013.01); *F16H 57/0473* (2013.01); *Y02T 10/6221* (2013.01)

(58) Field of Classification Search
CPC ..... F16H 57/02; F16H 57/04; F16H 57/0436
USPC ....................................................... 184/6.12
See application file for complete search history.

(56) References Cited

U.S. PATENT DOCUMENTS

| 2010/0105518 A1* | 4/2010 | Kasuya | B60K 6/387 477/5 |
| 2013/0111891 A1* | 5/2013 | Iwase | F16D 33/02 60/347 |

FOREIGN PATENT DOCUMENTS

| JP | A-2000-190749 | 7/2000 |
| JP | A-2005-291330 | 10/2005 |

(Continued)

OTHER PUBLICATIONS

International Search Report issued in International Application No. PCT/JP2012/078020 mailed Nov. 27, 2012.

*Primary Examiner* — William E Dondero
*Assistant Examiner* — Mark K Buse
(74) *Attorney, Agent, or Firm* — Oliff PLC

(57) ABSTRACT

A vehicle drive device having a rotating electrical machine, a speed change mechanism, and a case that accommodates the rotating electrical machine speed change mechanism. A first oil storage portion is provided so as to communicate with the speed change mechanism accommodating space. A hydraulic pump that supplies the oil in the first oil storage portion to the speed change mechanism and the rotating electrical machine. A second oil storage portion provided so as to communicate with the rotating electrical machine accommodating space. A discharge oil passage discharges the oil in the second oil storage portion to the first oil storage portion. The discharge oil passage includes a first opening that opens toward the first oil storage portion, and the first opening is provided so that its lower end is located above an oil level in the first oil storage portion during rotation of the hydraulic pump.

20 Claims, 7 Drawing Sheets

(56) References Cited

FOREIGN PATENT DOCUMENTS

| JP | A-2006-137406 | 6/2006 |
| JP | A-2011-105192 | 6/2011 |
| JP | A-2011-105195 | 6/2011 |
| JP | A-2011-131828 | 7/2011 |

\* cited by examiner

VEHICLE DRIVE DEVICE

INCORPORATION BY REFERENCE

The disclosure of PCT Patent Application No. PCT/JP2012/078020 filed on Oct. 30, 2012 including the specification, drawings and abstract is incorporated herein by reference in its entirety.

BACKGROUND OF THE INVENTION

The present invention relates to vehicle drive devices that include a rotating electrical machine, a speed change mechanism provided on a power transmission path connecting the rotating electrical machine and wheels, and a case that forms at least a rotating electrical machine accommodating space that accommodates the rotating electrical machine and a speed change mechanism accommodating space that accommodates the space change mechanism.

DESCRIPTION OF THE RELATED ART

Related art of such vehicle drive devices includes, e.g., a technology described in Japanese Patent Application Publication No. 2011-105195 (JP 2011-105195 A) (paragraph [0045], FIG. 2, etc.). In the description of the "Description of the Related Art" section, the names of relevant members in JP 2011-105195 A are shown in square brackets "[ ]." In the configuration described in JP 2011-105195 A, an oil storage portion [oil storage portion 101] that stores oil to be supplied to the rotating electrical machine is formed in the lower part of the space in a case accommodating a rotating electrical machine [electric motor 1]. In this configuration, as described in paragraph [0045] and FIG. 2 of JP 2011-105195 A, oil in the oil storage portion is thrown up by rotation of a rotor [rotor 13] to cool the rotating electrical machine.

In the configuration of JP 2011-105195 A, however, the oil thrown up by the rotation of the motor is supplied to the rotating electrical machine. This configuration is likely to increase rotation resistance of the rotor, energy efficiency of the device is reduced accordingly. Vehicle drive devices typically include an oil storage portion that stores oil to be supplied to a speed change mechanism. Such vehicle drive devices therefore can be configured to supply oil in the storage portion to the rotating electrical machine. However, JP 2011-105195 A does not describe such a configuration.

SUMMARY OF THE INVENTION

It is therefore desired to implement a vehicle drive device capable of appropriately supplying oil to a rotating electrical machine while rotation resistance of a rotor is suppressed.

A vehicle drive device according to an aspect of the present invention includes: a rotating electrical machine; a speed change mechanism provided in a power transmission path connecting the rotating electrical machine and wheels; a case that forms at least a rotating electrical machine accommodating space that accommodates the rotating electrical machine and a speed change mechanism accommodating space that accommodates the speed change mechanism; a first oil storage portion provided so as to communicate with the speed change mechanism accommodating space, and capable of storing oil; a hydraulic pump that supplies the oil in the first oil storage portion to the speed change mechanism and the rotating electrical machine; a second oil storage portion provided so as to communicate with the rotating electrical machine accommodating space, and capable of storing oil; and a discharge oil passage that discharges the oil in the second oil storage portion to the first oil storage portion. In the vehicle drive device, the discharge oil passage includes a first opening that opens toward the first oil storage portion, and the first opening is provided so that its lower end is located above an oil level in the first oil storage portion during rotation of the hydraulic pump.

As used herein, the "oil level in the first oil storage portion" means the oil level in the first oil storage portion in the state where the first oil storage portion is not subjected to an inertial force.

As used herein, the "rotating electrical machine" is used as a concept including all of a motor (electric motor), a generator (electric generator), and a motor-generator that functions as both a motor and a generator as necessary.

According to the aspect, the oil in the first oil storage portion can be supplied to the rotating electrical machine by the hydraulic pump. Thus, the oil can be appropriately supplied to the rotating electrical machine, and rotation resistance of the rotor can be suppressed as compared to the case where oil is thrown up by rotation of the rotor and supplied to the rotating electrical machine.

Since the vehicle drive device includes the second oil storage portion communicating with the rotating electrical machine accommodating space and the discharge oil passage that discharges the oil in the second oil storage portion to the first oil storage portion, the oil supplied to the rotating electrical machine can be collected in the second oil storage portion, and the oil collected in the second oil storage portion can be supplied to the first oil storage portion through the discharge oil passage. That is, an oil flow path is formed which collects the oil supplied to the rotating electrical machine by the hydraulic pump in the first oil storage portion from which the hydraulic pump sucks oil.

This discharge oil passage is formed so that the lower end of the first opening that opens toward the first oil storage portion is located above the oil level in the first oil storage portion during rotation of the hydraulic pump. This can suppress entry of the oil in the first oil storage portion into the discharge oil passage even if the oil level in the first oil storing portion is tilted with respect to the horizontal plane due to sudden braking, sudden acceleration, hard cornering, etc. of a vehicle. This can suppress backflow of the oil toward the second oil storage portion through the discharge oil passage, whereby the oil level in the second oil storage portion can be kept at a predetermined height or less. This can suppress an increase in rotation resistance of the rotor. Since the oil supplied to the rotating electrical machine can be efficiently collected in the first oil storage portion, suction of air due to reduction in oil level of the first oil storage portion can be suppressed.

In order to allow these effects to be implemented under many traveling conditions, the first opening may be provided so that its lower end is located above the highest oil level in the first oil storage portion during rotation of the hydraulic pump The discharge oil passage may be provided with a flow restricting mechanism that restricts oil flow in a direction from the first oil storage portion to the second oil storage portion.

With this configuration, even if the oil in the first oil storage portion flows into the discharge oil passage via the first opening, flow of the oil into the second oil storage portion via the second opening can be suppressed. This makes it easier to keep the oil level in the second oil storage portion at the predetermined height or less.

In the configuration in which the discharge oil passage is provided with the flow restricting mechanism as described above, the discharge oil passage may include a second opening that opens into the second oil storage portion, and the flow restricting mechanism may include a structure in which the second opening is located above the first opening.

With this configuration, the flow restricting mechanism can be implemented with a simple configuration without providing a separate member.

The discharge oil passage may include a first oil passage extending in a horizontal direction from the first opening, and a second oil passage extending in a direction downward with respect to the horizontal direction from the second opening and communicating with the first oil passage.

With this configuration, in the case where the first oil storage portion and the second oil storage portion are provided at different positions in the axial direction, the discharge oil passage can be appropriately formed by using a peripheral wall portion of the case, etc. Moreover, the discharge oil passage can be formed so as not to have a portion that extends upward from the second oil storage portion side toward the first oil storage portion side. Accordingly, no dedicated pump etc. need be provided in the discharge oil passage, and the oil in the second oil storage portion can be discharged to the first oil storage portion by a simple configuration using gravity.

In the configuration in which the discharge oil passage is provided with the flow restricting mechanism as described above, the flow restricting mechanism may include a flow direction restricting valve that is either a valve that switches from a closed state to an open state according to an oil pressure from a second oil storage portion side or a valve that switches from the open state to the closed state according to an oil pressure from a first oil storage portion side.

With this configuration, the possibility that the oil that has flown into the discharge oil passage via the first opening may flow into the second oil storage portion via the second opening can be easily suppressed while the function of the discharge oil passage is appropriately ensured.

In the configuration in which the discharge oil passage is provided with the flow restricting mechanism as described above, the first oil storage portion may have a wall having the first opening formed therein, and the flow restricting mechanism may include a protruding portion protruding from an inner wall surface of a part of the wall, the part being located below the lower end of the first opening.

With this configuration, the protruding portion can be formed by using a wall which can be easily processed or to which a part can be easily attached. Accordingly, the flow restricting mechanism can be provided while manufacturing cost of the device is suppressed.

The rotating electrical machine and an input shaft of the speed change mechanism may be arranged on a same axis.

With this configuration, since the rotating electrical machine and the input shaft of the speed change mechanism are arranged on the same axis, arrangement of each oil storage portion and each oil passage can be simplified.

The first oil storage portion may be formed below the speed change mechanism accommodating space, and the second oil storage portion may be formed below the rotating electrical machine accommodating space.

With this configuration, the first oil storage portion can be made to efficiently communicate with the speed change mechanism accommodating space, and the oil supplied to the speed change mechanism accommodating space can be easily stored in the first oil storage portion formed below the speed change mechanism accommodating space. Moreover, the second oil storage portion can be made to efficiently communicate with the rotating electrical machine mechanism accommodating space, and the oil supplied to the rotating electrical machine accommodating space can be easily stored in the second oil storage portion formed below the rotating electrical machine accommodating space.

The oil supplied to the rotating electrical machine by the hydraulic pump may be supplied to the second oil storage portion.

With this configuration, the oil supplied to the rotating electrical machine can be stored in the second oil storage portion communicating with the rotating electrical machine accommodating space.

DETAILED DESCRIPTION OF THE EMBODIMENTS

Figure 1:
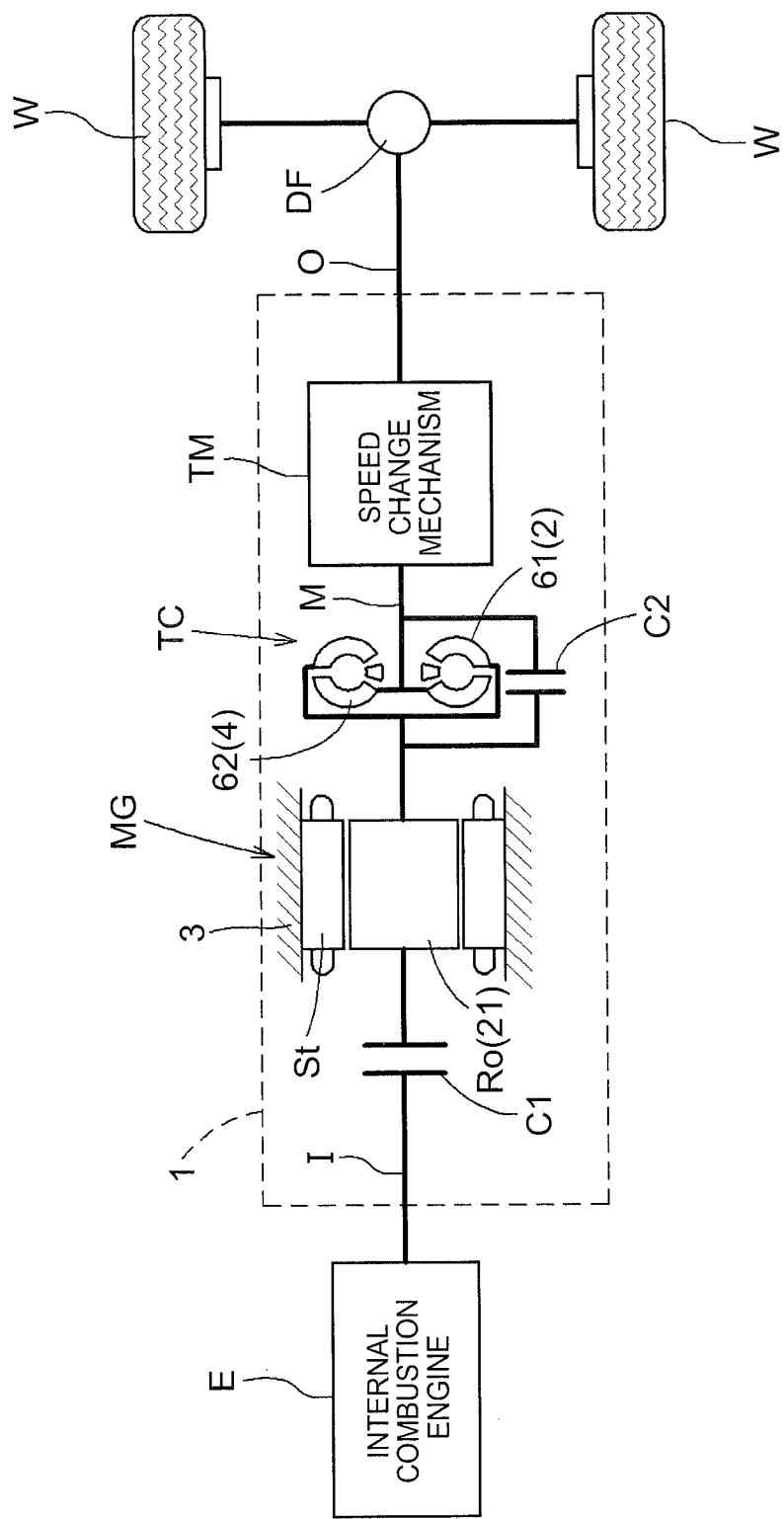
FIG. 1 is a schematic view showing a schematic configuration of a vehicle drive device according to an embodiment of the present invention.

Embodiments of a vehicle drive device according to the present invention will be described with reference to the accompanying drawings. In the following description, the "axial direction L," the "radial direction R," and the "circumferential direction" are defined with reference to the central axis (the central axis X shown in FIG. 2) of an input shaft of a speed change mechanism TM (a shift input shaft; in this example, an intermediate shaft M) unless otherwise specified. In the present embodiment, since all of a rotating electrical machine MG, a first clutch C1, and a torque converter TC are arranged coaxially with the speed change mechanism TM, the "axial direction," the "radial direction," and the "circumferential direction" of each of the rotating electrical machine MG, the first clutch C1, and the torque converter TC are identical to the "axial direction L," the "radial direction R," and the "circumferential direction" of the speed change mechanism TM, respectively. The "axial first direction L1" represents the direction from an output shaft of the speed change mechanism TM (a shift output shaft; in this example, an output shaft O) toward the shift input shaft along the axial direction L (the left direction in FIG. 2), and the "axial second direction L2" represents the opposite direction to the axial first direction L1 (the right direction in FIG. 2). The "radially inward direction R1" represents the direction inward in the radial direction R, and the "radially outward direction R2" represents the direction outward in the radial direction R.

In the following description, the terms "above" and "below" are defined based on the vertical direction V (see FIG. 2) in the state where the vehicle drive device 1 is mounted on a vehicle (the vehicle mounted state). The term "above" represents upward in FIG. 2, and the term "below" represents downward in FIG. 2. The direction of each member represents the direction of that member in the assembled state of a vehicle drive device 1. The terms regarding the direction, position, etc. of each member are used as a concept including an acceptable margin for manufacturing error.

As used herein, the expression "drivingly coupled" refers to the state where two rotating elements are coupled together so as to be able to transmit a driving force therebetween, and is used as a concept including the state where the two rotating elements are coupled together so as to rotate together, or the state where the two rotating elements are coupled together so as to be able to transmit a driving force therebetween via one or more transmission members. Such transmission members include various members that transmit rotation at the same speed or a changed speed, and for example, include a shaft, a gear mechanism, a belt, a chain. Such transmission members may include an engagement device that selectively transmits rotation and a driving force, such as, a friction engagement device and a meshing type engagement device.

1. Overall Configuration of Vehicle Drive Device

FIG. 1 is a schematic view showing a schematic configuration of the vehicle drive device 1 according to the present embodiment. As shown in FIG. 1, the vehicle drive device 1 includes an input shaft I drivingly coupled to an internal combustion engine E, a rotating electrical machine MG, a torque converter TC, a speed change mechanism TM, an output shaft O drivingly coupled to the speed change mechanism TM and wheels W, and a case 3. The torque converter TC includes a coupling input-side member 2 that is drivingly coupled to the rotating electrical machine MG, and a coupling output-side member 4 that makes a pair with the coupling input-side member 2. The speed change mechanism TM is drivingly coupled to the coupling output-side member 4 via an intermediate shaft M. That is, in the present embodiment, the speed change mechanism TM is drivingly coupled to the rotating electrical machine MG via the torque converter TC. The vehicle drive device 1 further includes a first clutch C1 capable of changing the engagement state between the input shaft I and the coupling input-side member 2. In the present embodiment, the rotating electrical machine MG is drivingly coupled to the speed change mechanism TM via the torque converter TC, and the first clutch C1 changes the engagement state between the input shaft I and the speed change mechanism TM by changing the engagement state between the input shaft I and the coupling input-side member 2. As shown in FIG. 1, the first clutch C1, the rotating electrical machine MG, the torque converter TC, and the speed change mechanism TM are arranged along a power transmission path between the input shaft I and the output shaft O in this order from the input shaft I side.

The internal combustion engine E is a motor that is driven by fuel combustion inside the engine to output power. For example, a gasoline engine, a diesel engine can be used as the internal combustion engine E. In the present embodiment, the input shaft I is drivingly coupled to an output shaft (a crankshaft etc.) of the internal combustion engine E via a damper 16 (see FIG. 2, not shown in FIG. 1). The input shaft I may be drivingly coupled to the output shaft of the internal combustion engine E without interposing the damper 16 therebetween. The input shaft I may be formed integrally with one of the two members to which the input shaft I is drivingly coupled (e.g., the output shaft of the internal combustion engine E), or may be formed as a separate member from both of the two members.

The first clutch C1 is provided between the input shaft I and the rotating electrical machine MG (a rotor member 21) in the power transmission path, and functions as an internal combustion engine separating clutch that separates the internal combustion engine E from the wheels W. The speed change mechanism TM is provided on the power transmission path connecting the rotating electrical machine MG and the wheels W. In this example, the speed change mechanism TM is provided between the torque converter TC and the output shaft O in the power transmission path. The speed change mechanism TM is formed by a mechanism capable of changing the speed ratio in a stepped or continuously variable manner (e.g., an automatic stepped speed change mechanism etc.), and shifts the rotational speed of the intermediate shaft M (a shift input shaft) drivingly coupled to the coupling output-side member 4 at a predetermined speed ratio to transmit the changed rotational speed to the output shaft O (a shift output shaft) drivingly coupled to an output differential gear unit DF.

The output shaft O is drivingly coupled to the wheels W via the output differential gear unit DF, and rotation and torque transferred to the output shaft O are distributed and transferred to the two wheels W, namely the right and left wheels W, via the output differential gear unit DF. The vehicle drive device 1 is thus capable of transferring the torque of one or both of the internal combustion engine E and the rotating electrical machine MG to the wheels W to move the vehicle. That is, the vehicle drive device 1 is configured as a drive device for hybrid vehicles, and specifically, is configured as a 1-motor parallel type hybrid drive device. The output shaft O may be formed integrally with one of the two members to which the output shaft O is drivingly coupled (e.g., a driveshaft), or may be formed as a separate member from both of the two members.

In the present embodiment, the input shaft I, the first clutch C1, the rotating electrical machine MG, the torque converter TC, the intermediate shaft M, the speed change mechanism TM, and the output member O are arranged on the central axis X (see FIG. 2), and the vehicle drive device 1 according to the present embodiment has a single axis configuration that is suitable for being mounted on front engine rear drive (FR) vehicles.

2. Configuration of Each Part of Drive Device

Figure 2:
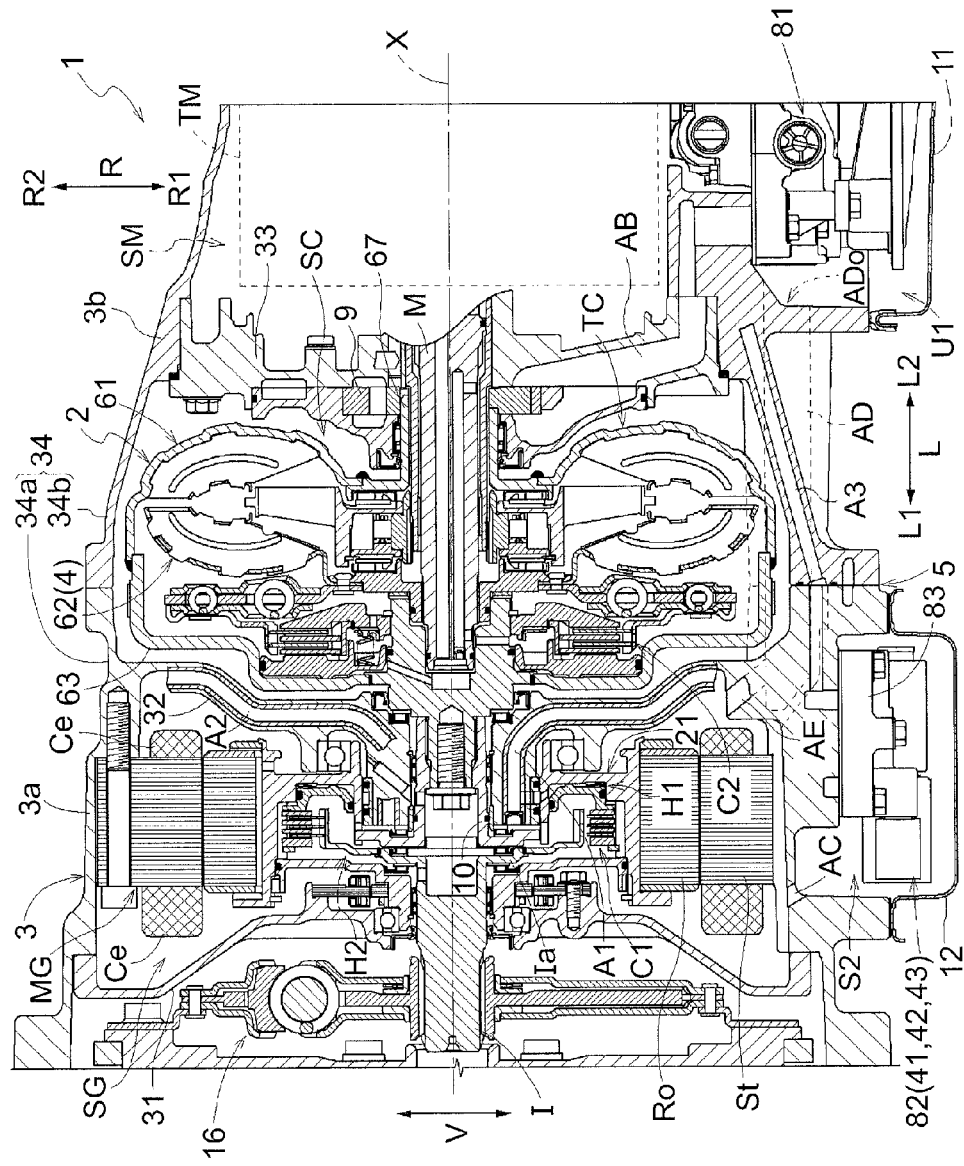
FIG. 2 is a partial sectional view of the vehicle drive device according to the embodiment of the present invention.
Figure 3:
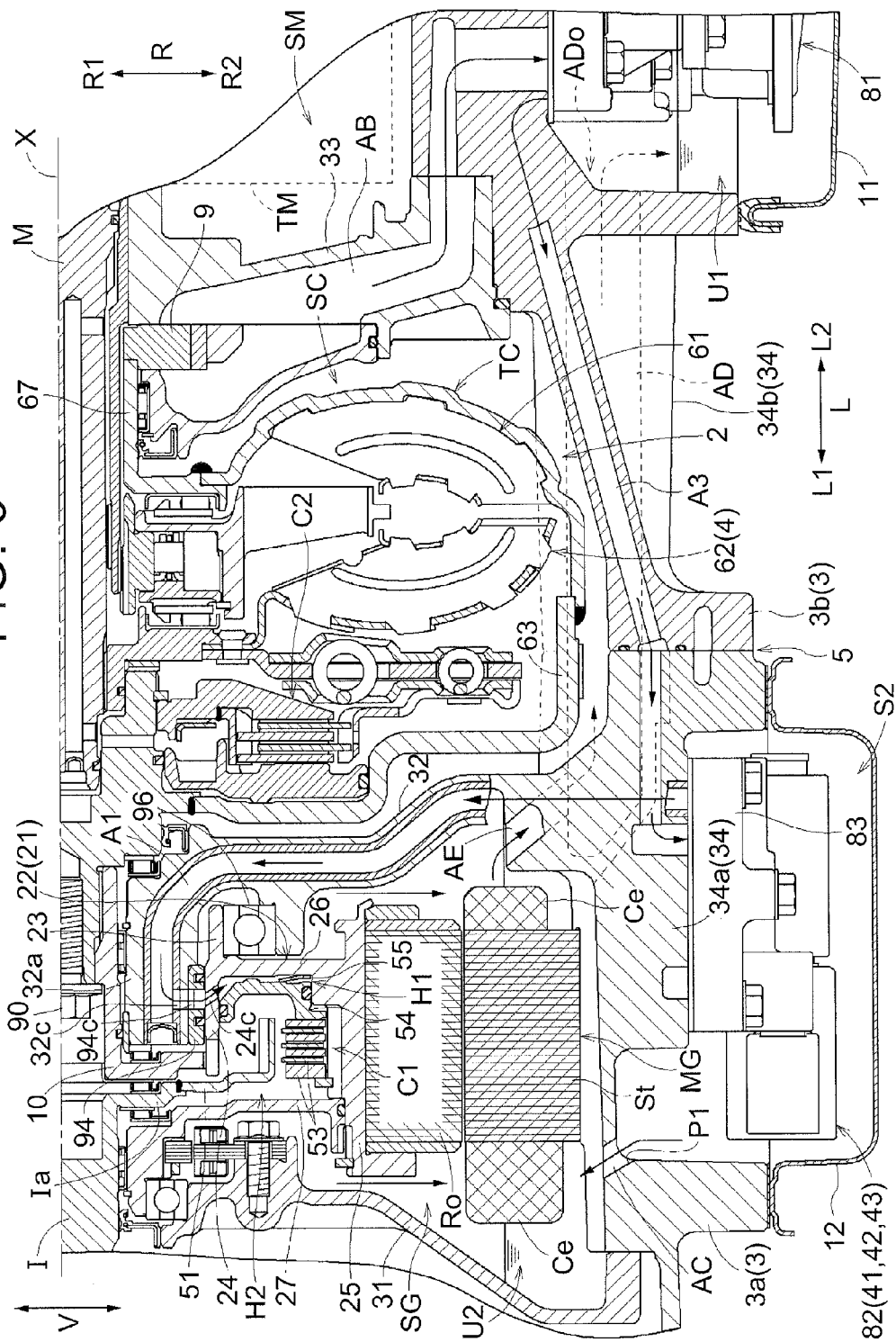
FIG. 3 is a partial enlarged view of FIG. 2.
Figure 4:
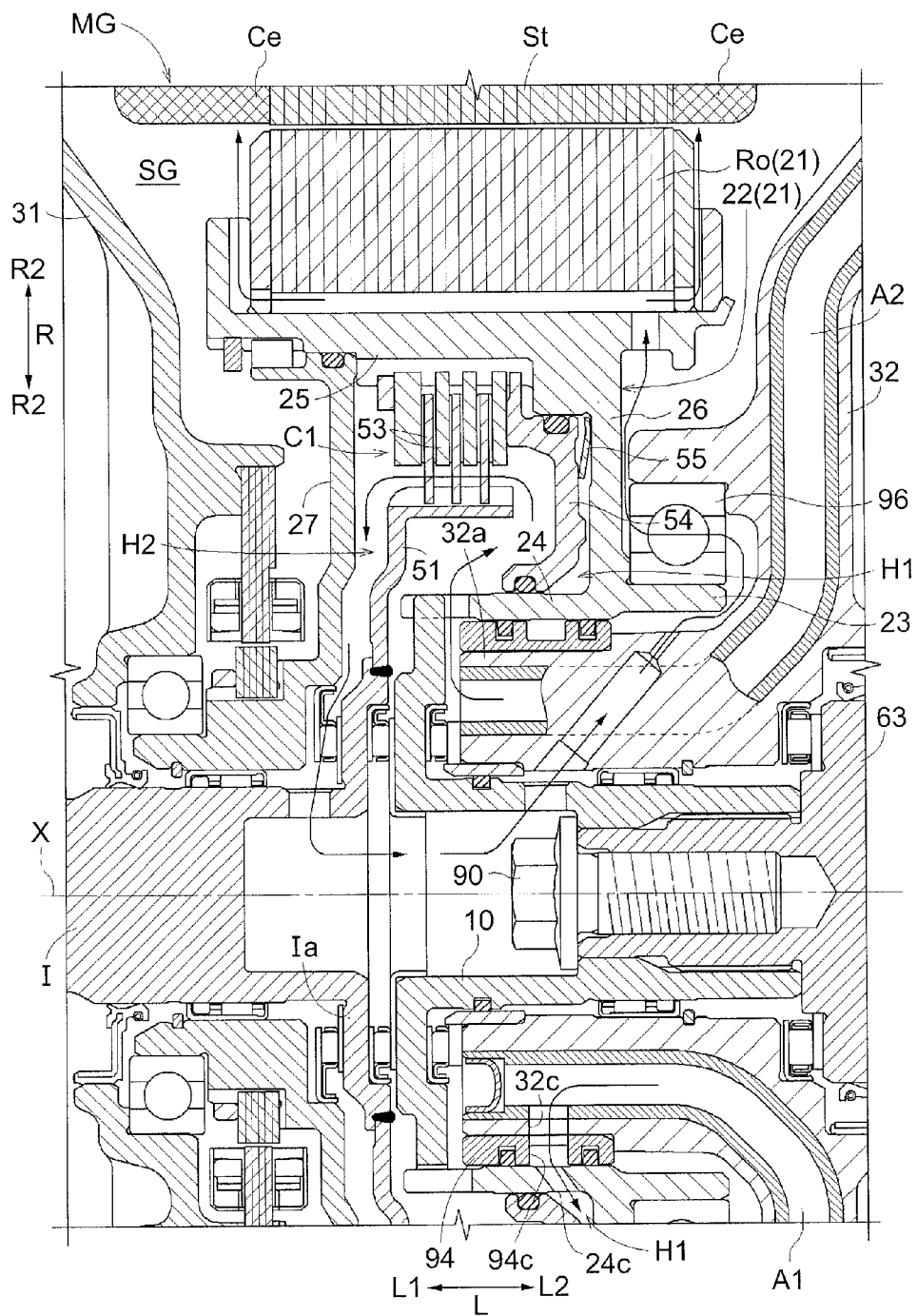
FIG. 4 is a partial enlarged view of FIG. 2.
Figure 5:
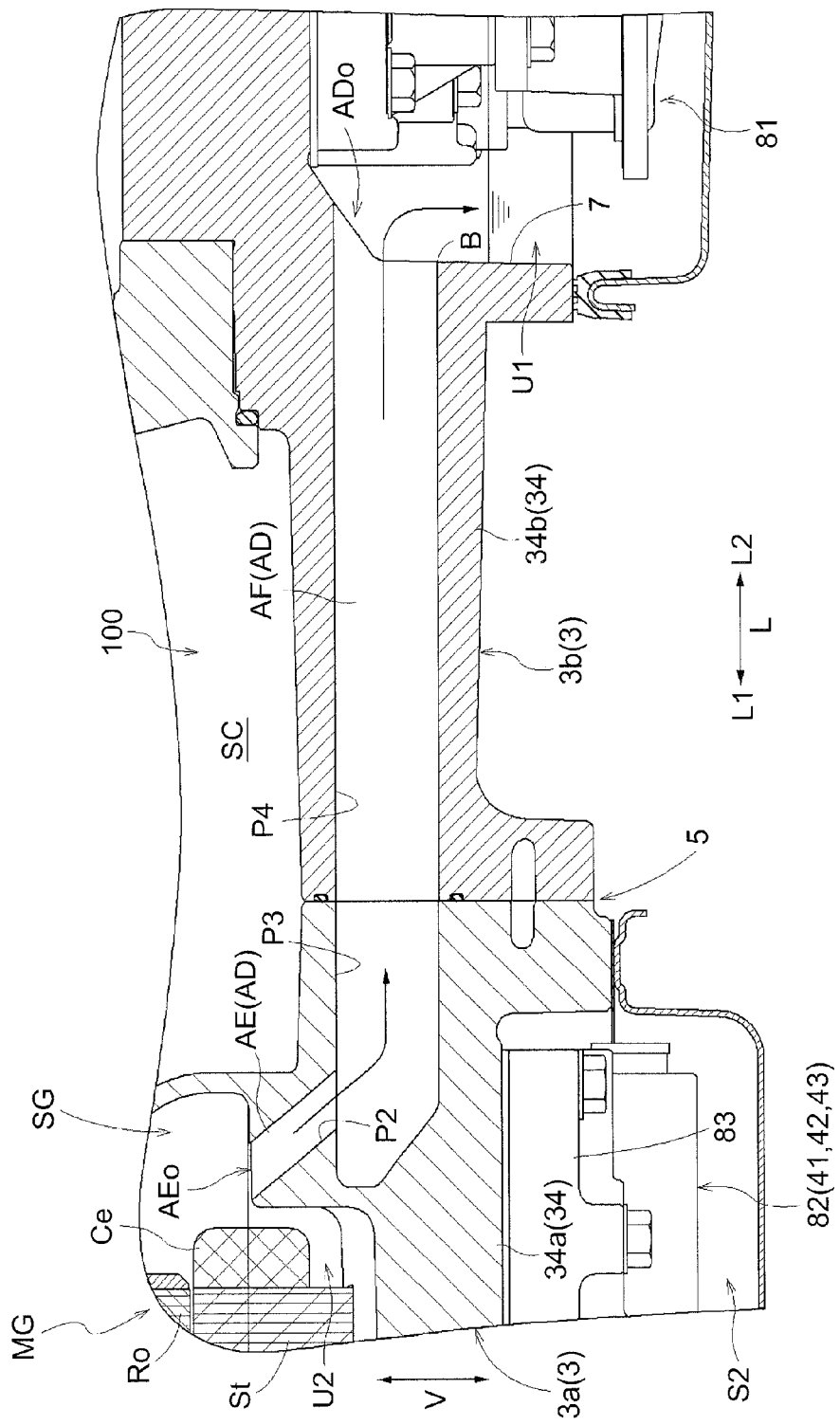
FIG. 5 is a partial sectional view of the vehicle drive device according to the embodiment of the present invention at a position different from FIG. 2.

The configuration of each part of the vehicle drive device 1 according to the present embodiment will be described below with reference to FIGS. 2 to 5. FIG. 2 is a sectional view of a part of the vehicle drive device 1 according to the present embodiment taken along a vertical plane including the central axis X, and FIGS. 3 and 4 are partial enlarged views of FIG. 2. FIG. 5 is a sectional view of a part of the vehicle drive device 1 according to the present embodiment taken along a vertical plane parallel to the central axis X at a different position in the horizontal direction from FIG. 2. A specific configuration of the speed change mechanism TM is not shown in FIGS. 2 and 3.

2-1. Rotating Electrical Machine

As shown in FIG. 2, the rotating electrical machine MG includes a stator St and the rotor member 21. The stator St is fixed to the case 3, and includes coil end portions Ce on both sides in the axial direction L. As shown in FIG. 3, the rotor member 21 includes a rotor Ro placed so as to face the stator St, and a rotor support member 22 supporting the rotor Ro so that the rotor Ro can rotate with respect to the case 3. In the present embodiment, the rotor Ro is placed on the radially inward direction R1 side of the stator St, and the rotor support member 22 is formed so as to extend in the radially inward direction R1 from the rotor Ro, and supports the rotor Ro from the radially inward direction R1 side.

As shown in FIGS. 3 and 4, in the present embodiment, the rotor support member 22 includes a rotor holding portion 25 holding the rotor Ro, and a radially extending portion 26. The rotor holding portion 25 is formed in a cylindrical shape that has an outer peripheral portion in contact with the inner peripheral surface of the rotor Ro, and a flange portion in contact with the side surface in the axial direction L of the rotor Ro. The radially extending portion 26 is formed in an annular disc shape extending in the radially inward direction R1 from a part of the rotor holding portion 25 which is located on the axial second direction L2 side with respect to the central part of the rotor holding portion 25 in the axial direction L. The radially extending portion 26 includes at its radially inward direction R1-side end a first axially protruding portion 23 as a cylindrical protruding portion protruding in the axial second direction L2, and a second axially protruding portion 24 as a cylindrical protruding portion protruding in the axial first direction L1. The first axially protruding portion 23 is a supported portion that is supported in the radial direction R by a bearing 96 so as to be rotatable with respect to the case 3 (specifically, a second support wall 32 described below). The second axially protruding portion 24 forms a connection portion with a coupling member 10 described below.

An annular disc-shaped plate-like member 27 is attached to the rotor support member 22 so as to rotate together therewith. The plate-like member 27 is attached to a part of the rotor holding portion 25 which is located on the axial first direction L1 side with respect to the central part of the rotor holding portion 25 in the axial direction L. A space that is defined by the rotor holding portion 25 on its radially outward direction R2 side and defined by the radially extending portion 26 and the plate-like member 27 on its both sides in the axial direction L is thus formed on the radially inward direction R1 side of the rotor holding portion 25. This space is an oil-tight space defined by sealing members placed as appropriate in each part, etc., and a hydraulic oil pressure chamber H1 and a circulating oil pressure chamber H2 of the first clutch C1, which are described below, are formed in this space.

2-2. First Clutch

The first clutch C1 is an engagement device that can be hydraulically operated to change its engagement state. The first clutch 1 is capable of switching the engagement state between two engagement members that are engaged by the first clutch C1 between a state where the two engagement members are engaged (including a slip-engaged state) and a state where the two engagement members are not engaged (a disengaged state). A driving force is transmitted between the input shaft I and the rotor member 21 in the state where the two engagement members are engaged. No driving force is transmitted between the input shaft I and the rotor member 21 in the state where the two engagement members are disengaged.

As shown in FIGS. 3 and 4, the first clutch C1 is placed in the oil-tight space defined by the rotor holding portion 25 on its radially outward direction R2 side and defined by the radially extending portion 26 and the plate-like member 27 on its both sides in the axial direction L. The first clutch C1 is thus positioned so as to have a portion overlapping the rotating electrical machine MG as viewed in the radial direction of the rotating electrical machine MG (in this example, the same direction as the radial direction R). More specifically, the first clutch C1 is positioned on the radially inward direction R1 side with respect to the rotor Ro so as to overlap a central region of the rotor Ro in the axial direction L as viewed in the radial direction R. As used herein, regarding arrangement of two members, the expression "have a portion overlapping as viewed in a predetermined direction" means that when the predetermined direction is assumed as a direction of line of sight, and a viewing point is moved in various directions perpendicular to the direction of line of sight, at least some area includes the viewing point from which the two members are seen to overlap each other.

In the present embodiment, the first clutch C1 is configured as a wet multi-plate clutch mechanism. Specifically, the first clutch C1 includes a clutch hub 51, friction members 53, a piston 54, and a biasing member 55. All of these members are positioned so as to have a portion overlapping the rotor Ro as viewed in the radial direction R. In this example, the rotor holding portion 25 of the rotor support member 22 functions as a clutch drum. The first clutch C1 has pairs of input-side and output-side friction members as the friction members 53. The input-side friction members are supported from the radially inward direction R1 side by an outer peripheral portion of the clutch hub 51, and the output-side friction members are supported from the radially outward direction R2 side by an inner peripheral portion of the rotor holding portion 25. The radially inward direction R1-side end of the clutch hub 51 is coupled to a flange portion Ia of the input shaft I.

As shown in FIG. 4, the hydraulic oil pressure chamber H1 of the first clutch C1 is surrounded by the radially extending portion 26 and the second axially protruding portion 24 of the rotor support member 22 and the piston 54. The circulating oil pressure chamber H2 of the first clutch C1 is mainly surrounded by the rotor holding portion 25 of the rotor support member 22 (the clutch drum), the plate-like member 27 attached to the rotor support member 22, and the piston 54, and the clutch hub 51 and the friction members 53 are accommodated in the circulating oil pressure chamber H2. The hydraulic oil pressure chamber H1 and the circulating oil pressure chamber H2 are placed on both sides of the piston 54 in the axial direction L, and are separated from each other in an oil-tight manner by a sealing member. In the present embodiment, both the hydraulic oil pressure chamber H1 and the circulating oil pressure chamber H2 are positioned on the radially inward direction R1 side with respect to the rotor Ro so as to overlap the rotor Ro along their entire lengths in the axial direction L as viewed in the radial direction R.

The biasing member 55 presses the piston 54 toward the friction member 53 in the axial direction L (in this example, in the axial first direction L1). The first clutch C1 is thus engaged or disengaged according to the balance between the pressing force applied to the piston 54 in the axial first direction L1 by the oil pressure in the hydraulic oil pressure chamber H1 and the biasing member 55 and the pressing force applied to the piston 54 in the axial second direction L2 by the oil pressure in the circulating oil pressure chamber H2. That is, in the present embodiment, the engagement state of the first clutch C1 can be controlled by sliding the piston 54 in the axial direction L according to the difference in oil pressure (the differential pressure) between the hydraulic oil pressure chamber H1 and the circulating oil pressure chamber H2. The circulating oil pressure chamber H2 is basically filled with oil of a predetermined pressure or more during traveling of the vehicle, and the friction members 53 are cooled by this oil.

2-3. Torque Converter

The torque converter TC includes the coupling input-side member 2 that is drivingly coupled to the rotor member 21 of the rotating electrical machine MG, and the coupling output-side member 4 that makes a pair with the coupling input-side member 2 and that is drivingly coupled to the wheels W. Specifically, as shown in FIG. 2, the torque converter TC includes a pump impeller 61, a turbine runner 62, a second clutch C2 as a lockup clutch, and a cover portion 63 accommodating these members. The cover portion 63 is coupled to the pump impeller 61 placed therein, so as to rotate together therewith, and is coupled to a pump drive shaft 67 described below so as to rotate together therewith. In the present embodiment, the pump impeller 61, the cover portion 63, and the pump drive shaft 67 form the coupling input-side member 2. The coupling output-side member 4 is formed by the turbine runner 62, and the turbine runner 62 is coupled (in this example, spline-coupled) to the intermediate shaft M. As shown in FIG. 1, the coupling output-side member 4 is thus drivingly coupled to the wheels W via the intermediate shaft M, the speed change mechanism TM, the output shaft O, and the output differential gear unit DF.

In the present embodiment, the coupling input-side member 2 is coupled to the rotor member 21 via the coupling member 10 so as to rotate together therewith. As described in detail below, as shown in FIG. 4, a cylindrical protruding portion 32a is formed in the second support wall 32 of the case 3. The coupling member 10 has a cylindrical axially extending portion extending in the axial direction L on the radially inward direction R1 side of the cylindrical protruding portion 32a, and an annular disc-shaped radially extending portion extending in the radial direction R on the axial first direction L1 side with respect to the cylindrical protruding portion 32a. The cover portion 63 forming the coupling input-side member 2 is spline-coupled to the axially extending portion of the coupling member 10, and the cover portion 63 and the coupling member 10 are fixed to each other by a fastening member 90 so as not to be movable relative to each other in the axial direction. The second axially protruding portion 24 of the rotor member 21 is coupled to the radially extending portion of the coupling member 10 so as to rotate together therewith while being movable relative to the radially extending portion of the coupling member 10 in the axial direction L. The coupling input-side member 2 is thus drivingly coupled to the rotor member 21 so as to rotate together therewith.

2-4. Case

The case 3 accommodates the rotating electrical machine MG, the torque converter TC, the speed change mechanism TM, and the first clutch C1. In the present embodiment, as shown in FIG. 2, the case 3 includes a first support wall 31, the second support wall 32, a third support wall 33, and a peripheral wall 34. The peripheral wall 34 is formed in a substantially cylindrical shape that covers the outer peripheries of the rotating electrical machine MG, the first clutch C1, the torque converter TC, the speed change mechanism TM, etc. The first support wall 31, the second support wall 32, and the third support wall 33 are arranged in this order from the axial first direction L1 side so as to divide in the axial direction L a space in the case which is formed on the radially inward direction R1 side of the peripheral wall 34.

As shown in FIG. 2, the case 3 forms a rotating electrical machine accommodating space SG that accommodates the rotating electrical machine MG, a fluid coupling accommodating space SC that accommodates the torque converter TC, and a speed change mechanism accommodating space SM that accommodates the speed change mechanism TM. In the present embodiment, the first clutch C1 is accommodated in the rotating electrical machine accommodating space SG. The rotating electrical machine accommodating space SG, the fluid coupling accommodating space SC, and the speed change mechanism accommodating space SM are formed in this order from the axial first direction L1 side. In the present embodiment, the rotating electrical machine MG and the first clutch C1, the torque converter TC, and the speed change mechanism TM are thus arranged in this order from the axial first direction L1 side to the axial second direction L2 side. That is, the rotating electrical machine MG, the first clutch C1, and the torque converter TC are placed on the axial first direction L1 side with respect to the speed change mechanism TM. The rotating electrical machine accommodating space SG, the fluid coupling accommodating space SC, and the speed change mechanism accommodating space SM are formed as spaces that are independent of each other. The expression "spaces that are independent of each other" means that the spaces are separated from each other in an oil-tight manner. Such a configuration is implemented by placing sealing members as appropriate in each part.

All of the rotating electrical machine accommodating space SG, the fluid coupling accommodating space SC, and the speed change mechanism accommodating space SM are formed as annular spaces. Specifically, the rotating electrical machine accommodating space SG is formed between the first support wall 31 and the second support wall 32 in the axial direction L. The fluid coupling accommodating space SC is formed between the second support wall 32 and the third support wall 33 in the axial direction L. The speed change mechanism accommodating space SM is formed between the third support wall 33 and a support wall (not shown) placed on the axial second direction L2 side with respect to the third support wall 33 in the axial direction L. All of the rotating electrical machine accommodating space SG, the fluid coupling accommodating space SC, and the speed change mechanism accommodating space SM are defined by the peripheral wall 34 on their radially outward direction R2 sides. The damper 16 is accommodated in a space in the case 3 which is located on the axial first direction L1 side with respect to the first support wall 31.

In the present embodiment, as shown in FIG. 2, the case 3 can be divided into a first case portion 3a and a second case portion 3b placed on the axial second direction L2 side with respect to the first case portion 3a. The first case portion 3a and the second case portion 3b are coupled together at a joint portion 5, and in the present embodiment, the respective peripheral walls 34 of the first case portion 3a and the second case portion 3b are fixedly fastened to each other by fastening bolts (not shown). A part of the peripheral wall 34 which is formed by the first case portion 3a is hereinafter referred to as the "first peripheral wall 34a," and a part of the peripheral wall 34 which is formed by the second case portion 3b is hereinafter referred to as the "second peripheral wall 34b."

The first case portion 3a is a portion that forms the rotating electrical machine accommodating space SG. Specifically, the first case portion 3a has the first support wall 31 and the second support wall 32, and the rotating electrical machine accommodating space SG is formed only by the first case portion 3*a*. In the present embodiment, the first case portion 3*a* further forms a space that accommodates the damper 16. The second case portion 3*b* is a portion that forms the speed change mechanism accommodating space SM. Specifically, the second case portion 3*b* has the third support wall 33, and the speed change mechanism accommodating space SM is formed only by the second case portion 3*b*. The first case portion 3*a* and the second case portion 3*b* together form the fluid coupling accommodating space SC in a region in the axial direction L which includes the joint portion 5 between the first case portion 3*a* and the second case portion 3*b*.

2-4-1. First Support Wall

As shown in FIG. 2, the first support wall 31 is formed on the axial first direction L1 side with respect to the rotating electrical machine MG (in this example, between the rotating electrical machine MG and the damper 16 in the axial direction L) so as to extend in the radial direction R and the circumferential direction. A through hole in the axial direction L is formed in the central part of the first support wall 31 in the radial direction R formed in a circular plate shape, and the input shaft I is inserted through this through hole. The first support wall 31 is shaped such that a radially inward direction R1-side part of the first support wall 31 is offset as a whole in the axial direction L so that the part is located on the axial second direction L2 side with respect to a radially outward direction R2-side part of the first support wall 31.

2-4-2. Second Support Wall

As shown in FIG. 2, the second support wall 32 is formed between the rotating electrical machine MG and the torque converter TC in the axial direction L so as to extend in the radial direction R and the circumferential direction. A through hole in the axial direction L is formed in the central part of the second support wall 32 in the radial direction R formed in a circular plate shape, and the coupling member 10 is placed in this through hole. The coupling input-side member 2 placed on the axial second direction L2 side with respect to the second support wall 32 and the rotor member 21 placed on the axial first direction L1 side with respect to the second support wall 32 are drivingly coupled to each other via the coupling member 10 so as to rotate together.

The second support wall 32 is shaped such that a radially inward direction R1-side part of the second support wall 32 is offset as a whole in the axial direction L so that the part is located on the axial first direction L1 side with respect to a radially outward direction R2-side part of the second support wall 32. As shown in FIG. 4, the cylindrical protruding portion 32*a* protruding in the axial first direction L1 is formed at the radially inward direction R1-side end of the second support wall 32, and the second support wall 32 has a thick portion (boss portion) having a predetermined thickness in the axial direction L at the radially inward direction R1-side end. The cylindrical protruding portion 32*a* is located on the radially inward direction R1 side with respect to the rotor member 21, and is positioned so as to have a portion overlapping the rotor member 21 as viewed in the radial direction R.

A first oil passage A1 and a second oil passage A2 are formed in the second support wall 32. As shown in FIGS. 3 and 4, the first oil passage A1 is an oil supply path that communicates with the hydraulic oil pressure chamber H1 of the first clutch C1 to supply oil for operating the piston 54 to the hydraulic oil pressure chamber H1. As shown in FIG. 4, the second oil passage A2 is an oil supply path that communicates with the circulating oil pressure chamber H2 of the first clutch C1 to supply oil for cooling the friction members 53 to the circulating oil pressure chamber H2. As shown in FIG. 4, the first oil passage A1 extends in the axial first direction L1 in the cylindrical protruding portion 32*a*, and then communicates with the hydraulic oil pressure chamber H1 via a communication hole 32*c* formed in the cylindrical protruding portion 32*a*, a through hole 94*c* formed in a sleeve member 94, and a through hole 24*c* formed in the second axially protruding portion 24 of the rotor support member 22. The sleeve member 94 is provided in order to restrict oil flow in the axial direction L through a clearance in the radial direction between the outer peripheral surface of the cylindrical protruding portion 32*a* and the inner peripheral surface of the second axially protruding portion 24.

As shown in FIG. 4, the second oil passage A2 is formed so as to extend in the axial first direction L1 in the cylindrical protruding portion 32*a* and then to open to the axial first direction L1-side end face of the cylindrical protruding portion 32*a*. This opening of the second oil passage A2 opens to a clearance in the axial direction L which is formed between the coupling member 10 and the cylindrical protruding portion 32*a*. A clearance extending through the second axially protruding portion 24 in the radial direction R is formed in the connection portion of the second axially protruding portion 24 with the coupling member 10. The second oil passage A2 communicates with the circulating oil pressure chamber H2 through these two clearances.

2-4-3. Third Support Wall

As shown in FIG. 2, the third support wall 33 is formed on the axial second direction L2 side with respect to the torque converter TC (in this example, between the torque converter TC and the speed change mechanism TM in the axial direction L) so as to extend in the radial direction R and the circumferential direction. A through hole in the axial direction L is formed in the central part of the third support wall 33 in the radial direction R formed in a circular plate shape, and the intermediate shaft M is inserted through this through hole. The third support wall 33 is provided with a hydraulic pump 9 that generates an oil pressure for supplying oil to each part of the vehicle drive device 1. Specifically, the third support wall 33 has a first portion fixed to the peripheral wall 34 (specifically, the second peripheral wall 34*b*) and a second portion attached to the axial first direction L1-side end face of the first portion. A pump chamber of the hydraulic pump 9 is formed in a space that is defined by the first portion and the second portion on its both sides in the axial direction L. A suction oil passage (not shown) and a discharge oil passage AB of the hydraulic pump 9 are formed in the third support wall 33.

As described above, the pump drive shaft 67 that drives the hydraulic pump 9 is drivingly coupled to the pump impeller 61 of the torque converter TC so as to rotate together therewith. As shown in FIG. 1, the pump impeller 61 is drivingly coupled to the rotating electrical machine MG and the internal combustion engine E. Accordingly, the hydraulic pump 9 is driven by the internal combustion engine E or the rotating electrical machine MG as a driving force source of the wheels W to discharge oil. The hydraulic pump 9 supplies oil in a first oil storage portion U1 described below to the speed change mechanism TM and the rotating electrical machine MG. Specifically, the oil pressure produced by the hydraulic pump 9 is controlled by a first hydraulic control device 81 described below, and the controlled oil pressure is supplied to the torque converter TC and the speed change mechanism TM. The oil pressure produced by the hydraulic pump 9 is also controlled by a second hydraulic control device 82 described below, and the controlled oil pressure is supplied to the first clutch C1. In the present embodiment, the oil supplied to the circulating oil pressure chamber H2 of the first clutch C1 flows in the circulating oil pressure chamber H2 and is then supplied to the rotating electrical machine MG

3. Configuration of Supplying Oil Pressure

The configuration of supplying an oil pressure in the vehicle drive device 1 according to the present embodiment will be described. The vehicle drive device 1 includes the first hydraulic control device 81 as a hydraulic control device that controls an oil pressure supplied from the hydraulic pump 9, and includes the second hydraulic control device 82 separately from the first hydraulic control device 81.

3-1. First Hydraulic Control Device

The first hydraulic control device 81 is a device that controls an oil pressure supplied from the hydraulic pump 9 to supply the controlled oil pressure to the torque converter TC and the speed change mechanism TM. As shown in FIG. 2, in the present embodiment, the first hydraulic control device 81 is provided on the second case portion 3b, and in this example, is provided on the lower part of the second case portion 3b. Specifically, the first hydraulic control device 81 is fixed to an outer peripheral portion of the second peripheral wall 34b of the second case portion 3b (in this example, a part of the outer peripheral portion which has a surface facing downward). In the present embodiment, the first hydraulic control device 81 is positioned so as to have a portion overlapping the speed change mechanism TM as viewed in the radial direction R that is the radial direction of the speed change mechanism TM. In this example, although not shown in the figure, the first hydraulic control device 81 is positioned so as to overlap, along its entire length in the axial direction L, the speed change mechanism TM as viewed in the radial direction R.

Specifically, the case 3 includes a first oil pan 11 that is attached to the lower part of the second case portion 3b, and a space surrounded by the second case portion 3b and the first oil pan 11 serves as a first hydraulic control device accommodating space that accommodates the first hydraulic control device 81. This first hydraulic control device accommodating space is positioned so as to have a portion overlapping the speed change mechanism TM as viewed from below. The first hydraulic control device 81 accommodated in the first hydraulic control device accommodating space is positioned so as to have a portion overlapping the speed change mechanism TM as viewed from below.

The first hydraulic control device 81 includes a plurality of hydraulic control valves and an oil flow path. The hydraulic control valves of the first hydraulic control device 81 include a speed change mechanism hydraulic control valve (not shown) that controls an oil pressure to be supplied to the speed change mechanism TM, and a fluid coupling hydraulic control valve (not shown) that controls an oil pressure to be supplied to the torque converter TC. The oil pressure supplied to the speed change mechanism TM is used to control the engagement state of each engagement device included in the speed change mechanism TM, and is also used to lubricate and cool a gear mechanism, a bearing, etc. which are included in the speed change mechanism TM. The oil pressure supplied to the torque converter TC is used as oil for power transmission in the torque converter TC, and is also supplied to a hydraulic oil pressure chamber of the second clutch C2 so as to be used to control the engagement state of the second clutch C2. The oil supplied to the speed change mechanism TM and the torque converter TC is returned to the first oil pan 11 placed below the speed change mechanism TM.

Although details are omitted, an oil cooler (heat exchanger) that cools oil is provided in series or in parallel in an oil circulating path that extends in the hydraulic pump 9, the first hydraulic control device 81, the torque converter TC, and the speed change mechanism TM. This oil cooler is provided on the second case portion 3b side. For example, the oil cooler may be configured so that at least oil supplied to a heat generating portion is returned to the first oil pan 11 via the oil cooler, or at least oil to be supplied to the heat generating portion is supplied via the oil cooler to a portion to which oil is to be supplied.

As shown in FIG. 3, oil collected in the first oil pan 11 is stored in the first hydraulic control device accommodating space. The first hydraulic control device accommodating space communicates with the speed change mechanism accommodating space SM through an opening formed in the second peripheral wall 34b. Accordingly, in the present embodiment, the first hydraulic control device accommodating space surrounded by the second case portion 3b and the first oil pan 11 forms the first oil storage portion U1. In this example, the first oil storage portion U1 is formed below the speed change mechanism accommodating space SM. The hydraulic pump 9 sucks the oil stored in the first oil storage portion U1 and generates an oil pressure.

A line pressure as a discharge pressure (output pressure) of the hydraulic pump 9 is controlled by a line pressure control valve (not shown). For example, a pressure regulator valve is used as the line pressure control valve, and the line pressure is controlled based on a reference pressure supplied to a reference pressure chamber. In the present embodiment, the line pressure control valve is provided in the first hydraulic control device 81, and the oil pressure controlled (regulated) by the line pressure control valve is supplied to the second hydraulic control device 82 via a third oil passage A3.

3-2. Second Hydraulic Control Device

The second hydraulic control device 82 is a device that controls an oil pressure supplied from the hydraulic pump 9 to supply the controlled oil pressure to the first clutch C1. As shown in FIG. 2, in the present embodiment, the second hydraulic control device 82 is provided on the first case portion 3a, and in this example, is provided on the lower part of the first case portion 3a. The first case portion 3a is a portion that forms the rotating electrical machine accommodating space SG, and the second hydraulic control device 82 is provided on a part of the case 3 which forms the rotating electrical machine accommodating space SG. That is, the second hydraulic control device 82 is provided on a region of the case 3 which forms the rotating electrical machine accommodating space SG Specifically, the second hydraulic control device 82 is fixed to an outer peripheral portion of the first peripheral wall 34a of the first case portion 3a (in this example, a part of the outer peripheral portion which has a surface facing downward). The first case portion 3a is placed on the axial first direction L1 side with respect to the second case portion 3b having the first hydraulic control device 81 provided thereon. Accordingly, in the present embodiment, the second hydraulic control device 82 is placed on the axial first direction L1 side with respect to the first hydraulic control device 81. Specifically, the first hydraulic control device 81 is placed on the axial second direction L2 side with respect to the joint portion 5 between the first case portion 3a and the second case portion 3b, and the second hydraulic control device 82 is placed on the axial first direction L1 side with respect to the joint portion 5. In the present embodiment, the second hydraulic control device 82 is placed below the upper end of the first hydraulic control device 81.

Specifically, the case 3 includes a second oil pan 12 that is attached to the lower part of the first case portion 3a, and a space surrounded by the first case portion 3a and the second oil pan 12 serves as a second hydraulic control device accommodating space that accommodates the second hydraulic control device 82. That is, the second hydraulic control device accommodating space is a space formed by the case 3 separately from the rotating electrical machine accommodating space SG, and forms a second accommodating space S2 that accommodates the second hydraulic control device 82. The second accommodating space S2 is positioned so as to have a portion overlapping the rotating electrical machine MG as viewed from below, and is positioned so as to have a portion overlapping the first clutch C1 as viewed from below. The second oil pan 12 is provided independently of the first oil pan 11. That is, the first oil pan 11 and the second oil pan 12 are formed by separate members from each other, and are attached to different positions on the case 3 from each other. Specifically, the first oil pan 11 is placed on the axial second direction L2 side with respect to the joint portion 5 between the first case portion 3a and the second case portion 3b, and the second oil pan 12 is placed on the axial first direction L1 side with respect to the joint portion 5.

As shown in FIG. 3, the second hydraulic control device 82 is positioned so as to have a portion overlapping the rotating electrical machine MG as viewed in the radial direction of the rotating electrical machine MG (in this example, the same direction as the radial direction R). In this example, the second hydraulic control device 82 is shifted to the axial second direction L2 side with respect to the rotating electrical machine MG so that an axial first direction L1-side part of the second hydraulic control device 82 overlaps the rotating electrical machine MG (specifically, the stator St) as viewed in the radial direction R. In the present embodiment, the second hydraulic control device 82 is also positioned so as to have a portion overlapping the rotating electrical machine MG as viewed from below.

As shown in FIG. 3, the second hydraulic control device 82 is positioned so as to have a portion overlapping the first clutch C1 as viewed in the radial direction of the first clutch C1 (in this example, the same direction as the radial direction R). In the present embodiment, the second hydraulic control device 82 is positioned so as to have a portion overlapping all of the clutch hub 51, the piston 54, the friction members 53, the clutch drum (in this example, the rotor holding portion 25), the hydraulic oil pressure chamber H1, and the circulating oil pressure chamber H2 that form the first clutch C1, as viewed in the radial direction R. The second hydraulic control device 82 may be positioned so as to have a portion overlapping only at least one of these members and these oil pressure chambers as viewed in the radial direction R. In this case, it is preferable that the second hydraulic control device 82 be positioned so as to have a portion overlapping at least a servo mechanism (in this example, the piston 54, the biasing member 55, and the hydraulic oil pressure chamber H1) as viewed in the radial direction R.

Figure 6:
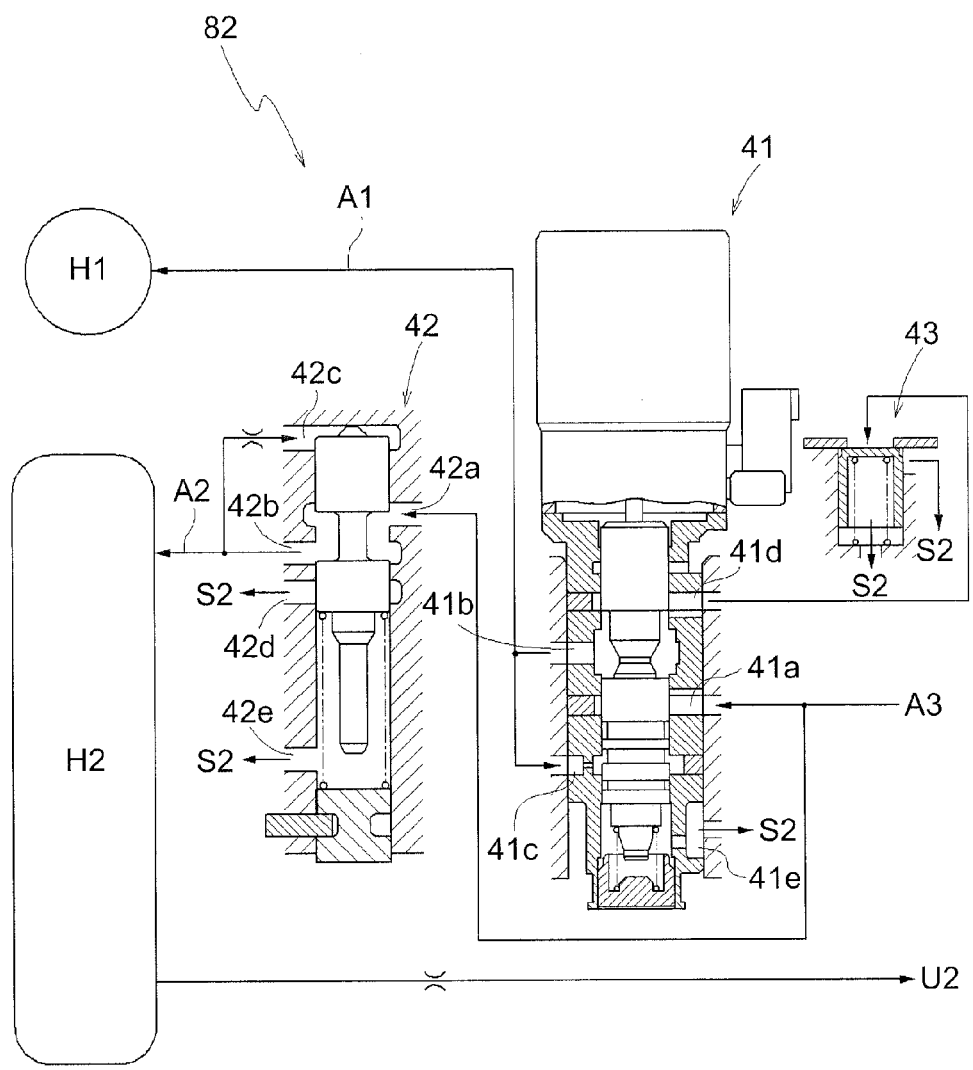
FIG. 6 is a view showing a schematic configuration of a hydraulic control system of a second hydraulic control device according to the embodiment of the present invention.

The second hydraulic control device 82 includes a plurality of hydraulic control valves, and a valve body 83 having an oil passage communicating with the hydraulic control valves. In the present embodiment, as shown in FIG. 3, oil discharged from the hydraulic pump 9 is supplied to the second hydraulic control device 82 via the first hydraulic control device 81 and the third oil passage A3. As described above, a line pressure controlled by the first hydraulic control device 81 is supplied to the third oil passage A3, and the second hydraulic control device 82 supplies a controlled oil pressure to the first clutch C1. Specifically, as shown in FIG. 6, the second hydraulic control device 82 includes a first hydraulic control valve 41 and a second hydraulic control valve 42 as the hydraulic control valves. The first hydraulic control valve 41 is a hydraulic control valve that controls an oil pressure to be supplied to the hydraulic oil pressure chamber H1 of the first clutch C1. The second hydraulic control valve 42 is a hydraulic control valve that controls (regulates) an oil pressure to be supplied to the circulating oil pressure chamber H2 of the first clutch C1.

In the present embodiment, the first hydraulic control valve 41 is a linear solenoid valve having an electromagnetic portion and a pressure regulating portion. The electromagnetic portion is a portion functioning as an actuator that controls the position of a valve body (spool). The pressure regulating portion is a portion functioning as a valve, and is inserted in a valve insertion hole formed in the valve body 83. The first hydraulic control valve 41 includes an input port 41a to which oil having the line pressure is supplied, an output port 41b that discharges oil to the first oil passage A1, a feedback port 41c that generates a feedback pressure, and a first discharge port 41d and a second discharge port 41e that discharge (drain) oil. Oil having a pressure according to the state of current application to the electromagnetic portion is supplied to the hydraulic oil pressure chamber H1 of the first clutch C1 via the first oil passage A1. Thus, the first hydraulic control valve 41 is configured so as to communicate with both the first oil passage A1 and the third oil passage A3, and a part of the first oil passage A1 and a part of the third oil passage A3 are formed in the valve body 83.

The first discharge port 41d of the first hydraulic control valve 41 has a function to discharge oil to the third hydraulic control valve 43 side as appropriate in order to adjust the amount of oil to be supplied from the output port 41b to the first oil passage A1 according to the feedback pressure. The first discharge port 41d also has a function to discharge part of oil in the first oil passage A1 to the third hydraulic control valve 43 side when the oil pressure to be supplied to the hydraulic oil pressure chamber H1 is reduced. The third hydraulic control valve 43 is a valve that allows its input port to communicate with its output port when the oil pressure that is supplied to the input port of the third hydraulic control valve 43 has a predetermined value or more. That is, the third hydraulic control valve 43 functions as a check valve that functions to retain oil in the first oil passage A1 and that restricts backflow of oil from the third hydraulic control valve 43 toward the first hydraulic control valve 41. Oil discharged from the output port of the third hydraulic control valve 43 is discharged to the second accommodating space S2. The second discharge port 41e of the first hydraulic control valve 41 has a function to discharge oil in a spring chamber to the second accommodating space S2 when the pressure of this oil becomes high.

In the present embodiment, the second hydraulic control valve 42 is a pressure regulation valve of a type that opens and closes an input port 42a and opens and closes a first discharge port 42d. The second hydraulic control valve 42 includes the input port 42a to which oil having a line pressure is supplied, an output port 42b that discharges oil to the second oil passage A2, a feedback port 42c that generates a feedback pressure, and the first discharge port 42d and a second discharge port 42e that discharge (drain) oil. The oil pressure controlled by the second hydraulic control valve 42 is supplied to the circulating oil pressure chamber H2 of the first clutch C1 via the second oil passage A2. The first discharge port 42d of the second hydraulic control valve 42 has a function to discharge oil to the second accommodating space S2 as appropriate in order to adjust the amount of oil to be supplied from the output port 42b to the second oil passage A2 according to the feedback pressure. The second discharge port 42e of the second hydraulic control valve 42 has a function to discharge oil in a spring chamber to the second accommodating space S2 when the pressure of this oil becomes high. The second hydraulic control valve 42 is thus configured to communicate with the second oil passage A2, and a part of the second oil passage A2 is formed in the valve body 83.

As shown in FIG. 3, the second accommodating space S2 communicates with the lower part of the rotating electrical machine accommodating space SG through a communicating oil passage AC. As shown in FIG. 3, in the present embodiment, a first hole P1 that is formed in the first peripheral wall 34a of the first case portion 3a to allow the outer peripheral surface of the first peripheral wall 34a to communicate with the inner peripheral surface thereof forms the communicating oil passage AC. The communicating oil passage AC (the first hole P1) is formed in a part of the first peripheral wall 34a which has a small thickness in the radial direction R. This can reduce the length of the communicating oil passage AC, and can suppress oil flow resistance in the communicating oil passage AC. In this example, the communicating oil passage AC is an oil passage whose flow path width and flow path length are about the same.

The second accommodating space S2 is a space that is defined in an oil-tight manner except the communicating oil passage AC so that oil can be discharged from the second accommodating space S2 only through the communication oil passage AC. Since the second accommodating space S2 is located below the rotating electrical machine accommodating space SG, the communicating oil passage AC is formed in the upper part (the ceiling part) of the second accommodating space S2. Accordingly, the second accommodating space S2 is basically filled with oil, and the oil discharged from an oil discharge port of the second hydraulic control device 82 is discharged via the communicating oil passage AC to the rotating electrical machine accommodating space SG located above the second hydraulic control device 82. In the present embodiment, the first discharge port 41d and the second discharge port 41e of the first hydraulic control valve 41, and the first discharge port 42d and the second discharge port 42e of the second hydraulic control valve 42 form the "oil discharge port" of the second hydraulic control device 82.

As an example is shown in FIG. 3, during rotation of the hydraulic pump 9, the second accommodating space S2 is thus filled with oil, and the oil is accumulated to the level in the lower part of the rotating electrical machine accommodating space SG. Oil is basically accumulated only in the lower part of the rotating electrical machine accommodating space SG with which the second accommodating space S2 communicates via the communicating oil passage AC. Accordingly, even if oil having a high pressure is discharged from the oil discharge port of the second hydraulic control device 82 to the second accommodating space S2, a change in oil pressure can be absorbed by a change in oil level in the rotating electrical machine accommodating space SG. This can suppress a rapid increase in oil pressure in the second accommodating space S2.

In the present embodiment, as shown in FIG. 4, an oil flow path is formed through which oil supplied to the circulating oil pressure chamber H2 of the first clutch C1 via the second oil passage A2 is supplied to the coil end portions Ce of the rotating electrical machine MG via the bearing 96. The oil supplied to the circulating oil pressure chamber H2 can thus be used to cool the bearing 96 supporting the rotor Ro and to cool the rotating electrical machine MG including the coil end portions Ce. Oil discharged by the hydraulic pump 9 is thus supplied to the rotating electrical machine MG.

As shown in FIG. 3, oil supplied to the rotating electrical machine MG is stored in the lower part of the rotating electrical machine accommodating space SG. That is, in the present embodiment, a part (specifically, a part of the lower part) of the rotating electrical machine accommodating space SG forms a second oil storage portion U2. The second oil storage portion U2 is formed in the lower part of the rotating electrical machine accommodating space SG, and oil supplied to the rotating electrical machine MG by the hydraulic pump 9 is supplied to the second oil storage portion U2. In the present embodiment, the second oil storage portion U2 communicates with the oil discharge port of the second hydraulic control device 82 via the communicating oil passage AC. Accordingly, oil supplied to the rotating electrical machine MG is stored in the second oil storage portion U2, and oil discharged from the oil discharge port of the second hydraulic control device 82 is also stored in the second oil storage portion U2.

As shown in FIG. 5, oil stored in the second oil storage portion U2 is discharged to the first oil storage portion U1 via a discharge oil passage AD. In the present embodiment, the discharge oil passage AD is formed so as to extend through the joint portion 5 between the first case portion 3a and the second case portion 3b to extend to both sides in the axial direction L. In the present embodiment, the discharge oil passage AD is formed at a different position in the horizontal direction from the third oil passage A3 so as to overlap the third oil passage A3 in the vertical direction. The discharge oil passage AD is therefore shown by broken lines in FIGS. 2 and 3.

As shown in FIG. 5, the discharge oil passage AD has a second opening AEo that opens into the second oil storage portion U2, and a first opening ADo that opens toward the first oil storage portion U1. The first opening ADo is formed in a wall 7 of the first oil storage portion U1, specifically, a wall 7 that defines the axial first direction L1 side of the first oil storage portion U1 (the first hydraulic control device accommodating space). In the present embodiment, the second opening AEo is placed above the first opening ADo. The discharge oil passage AD includes a first discharge oil passage AF extending in the horizontal direction (specifically, the axial direction L) from the first opening ADo, and a second discharge oil passage AE extending in a direction downward with respect to the horizontal direction (in this example, in a direction at about 45 degrees downward with respect to the horizontal direction) from the second opening AEo and communicating with the first discharge oil passage AF. In this example, the first discharge oil passage AF extends in the axial first direction L1 from the first opening ADo, and communicates with the second discharge oil passage AE at a position located on the axial first direction L1 side with respect to the joint portion 5. Accordingly, in this example, the first discharge oil passage AF is configured so that a third hole P3 formed in the first peripheral wall 34a so as to extend in the axial direction L and a fourth hole P4 formed in the second peripheral wall 34b so as to extend in the axial direction L are connected together in the axial direction L. In the present embodiment, the first discharge oil passage AF corresponds to the "first oil passage" in the present invention, and the second discharge oil passage AE corresponds to the "second oil passage" in the present invention.

The second discharge oil passage AE has the second opening AEo in its upper end, and the lower end of the second discharge oil passage AE opens in the upper surface portion (the ceiling portion) of the first discharge oil passage AF. Specifically, the second discharge oil passage AE is formed by a second hole P2 that allows the inner peripheral surface of the first peripheral wall 34a to communicate with the upper surface portion of the third hole P3 that forms the first discharge oil passage AF. A sealing member is provided around a part of the discharge oil passage AD which extends through the joint portion 5 (the connection portion between the third hole P3 and the fourth hole P4 in the joint portion 5). This suppresses leakage of oil in the discharge oil passage AD to the outside of the case 3 via the joint portion 5. As shown in FIG. 3, a sealing member is also provided around a part of the third oil passage A3 which extends through the joint portion 5. This suppresses leakage of oil in the third oil passage A3 to the outside of the case 3 via the joint portion 5.

As shown in FIG. 5, the first opening ADo is provided so that its lower end B is located above the oil level in the first oil storage portion U1 during rotation of the hydraulic pump 9 (during driving of the hydraulic pump 9). As used herein, the term "oil level" in the expression "above the oil level in the first oil storage portion" means the oil level in the state where the first oil storage portion U1 (oil in the first oil storage portion U1) is not subjected to an inertial force, that is, the state where the vehicle is traveling straight at a constant speed or the vehicle is stopped. The oil level in the first oil storage portion U1 in the state where the first oil storage portion U1 is not subjected to an inertial force may change according to the rotational speed of the pump drive shaft 67, the rotational speed of each rotating member such as a gear of the speed change mechanism TM, the oil temperature, etc. However, the variation range of the oil level can be predicted based on the amount, characteristics (viscosity etc.), etc. of oil to be circulated in the case 3. It is preferable that the lower end B of the first opening ADo be located above the maximum value (i.e., the highest oil level) in the variation range of the oil level in the first oil storage portion U1 during rotation of the hydraulic pump 9.

As described above, the first opening ADo is provided so that its lower end B is located above the oil level in the first oil storage portion U1 during rotation of the hydraulic pump 9. This can suppress entry of oil in the first oil storage portion U1 into the discharge oil passage AD even if the oil level in the first oil storage portion U1 is tilted with respect to the horizontal plane due to sudden braking, sudden acceleration, hard cornering, etc. of the vehicle. Moreover, in the present embodiment, the second opening AEo is located above the first opening ADo. In other words, the lower end of the second opening AEo is located above the lower end B of the first opening ADo, and in this example, is located above the upper end of the first opening ADo. This can suppress entry of oil in the first oil storage portion U1 into the second oil storage portion U2 via the second opening AEo even if the oil in the first oil storage portion U1 flows into the discharge oil passage AD via the first opening ADo. No dedicated pump etc. need be provided in the discharge oil passage AD, and a simple configuration using gravity can be used to efficiently return oil in the second oil storage portion U2 to the first oil storage portion U1 to which the suction oil passage (not shown) of the hydraulic pump 9 is connected.

As described above, in the present embodiment, the second opening AEo is placed above the first opening ADo. This restricts oil flow in the direction from the first oil storage portion U1 to the second oil storage portion U2 in the discharge oil passage AD. In other words, the discharge oil passage AD is provided with a flow restricting mechanism 100 that restricts oil flow in the direction from the first oil storage portion U1 to the second oil storage portion U2. In the present embodiment, the flow restricting mechanism 100 is formed by the structure in which the second opening AEo is located above the first opening ADo.

As described above, oil supplied to the rotating electrical machine MG and oil discharged from the oil discharge port of the second hydraulic control device 82 are supplied to the second oil storage portion U2. In the present embodiment, an allowable oil flow rate in a portion having the smallest sectional area in the discharge oil passage AD is designed to be larger than the amount of oil that is supplied to the second oil storage portion U2. In the present embodiment, the sectional area of the first discharge oil passage AF is designed to be larger than that of the second discharge oil passage AE, and the portion having the smallest sectional area in the discharge oil passage AD is the second discharge oil passage AE. Accordingly, the sectional area of the second discharge oil passage AE is designed so that the allowable oil flow rate in the second discharge oil passage AE is larger than the amount of oil that is supplied to the second oil storage portion U2. Thus, the oil level in the second oil storage portion U2 is basically determined by the height (the position in the vertical position) of the upper end (i.e., the second opening AEo) of the second discharge oil passage AE, and specifically, is about the same height as that of the upper end of the second discharge oil passage AE. In the present embodiment, as shown in FIG. 5, the second discharge oil passage AE is formed so that the second opening AEo is located below the lowermost part of the inner peripheral surface of the stator St (specifically, a stator core). This can reduce the possibility that the oil level in the second oil storage portion U2 may become higher than the lowermost part of the inner peripheral surface of the stator St even during rotation of the hydraulic pump 9, and can suppress an increase in rotation resistance of the rotor Ro.

In the present embodiment, oil sucked from the first oil storage portion U1 and discharged by the hydraulic pump 9 is supplied to both the first hydraulic control device 81 and the second hydraulic control device 82. As described above, since the oil cooler is provided in the oil circulating path that extends in the hydraulic pump 9, the first hydraulic control device 81, the torque converter TC, and the speed change mechanism TM, the temperature of oil that is stored in the first oil storage portion U1 can be kept at a predetermined temperature or less. Thus, oil having a temperature capable of cooling the rotating electrical machine MG can be easily supplied to the rotating electrical machine MG even if no oil cooler is provided in the oil flow path between the second hydraulic control device 82 and the rotating electrical machine MG.

4. Other Embodiments

Lastly, other embodiments of the vehicle drive device of the present invention will be described below. The configuration disclosed in each of the following embodiments may be combined with any of the configurations disclosed in the other embodiments as long as no inconsistency arises.

Figure 7:
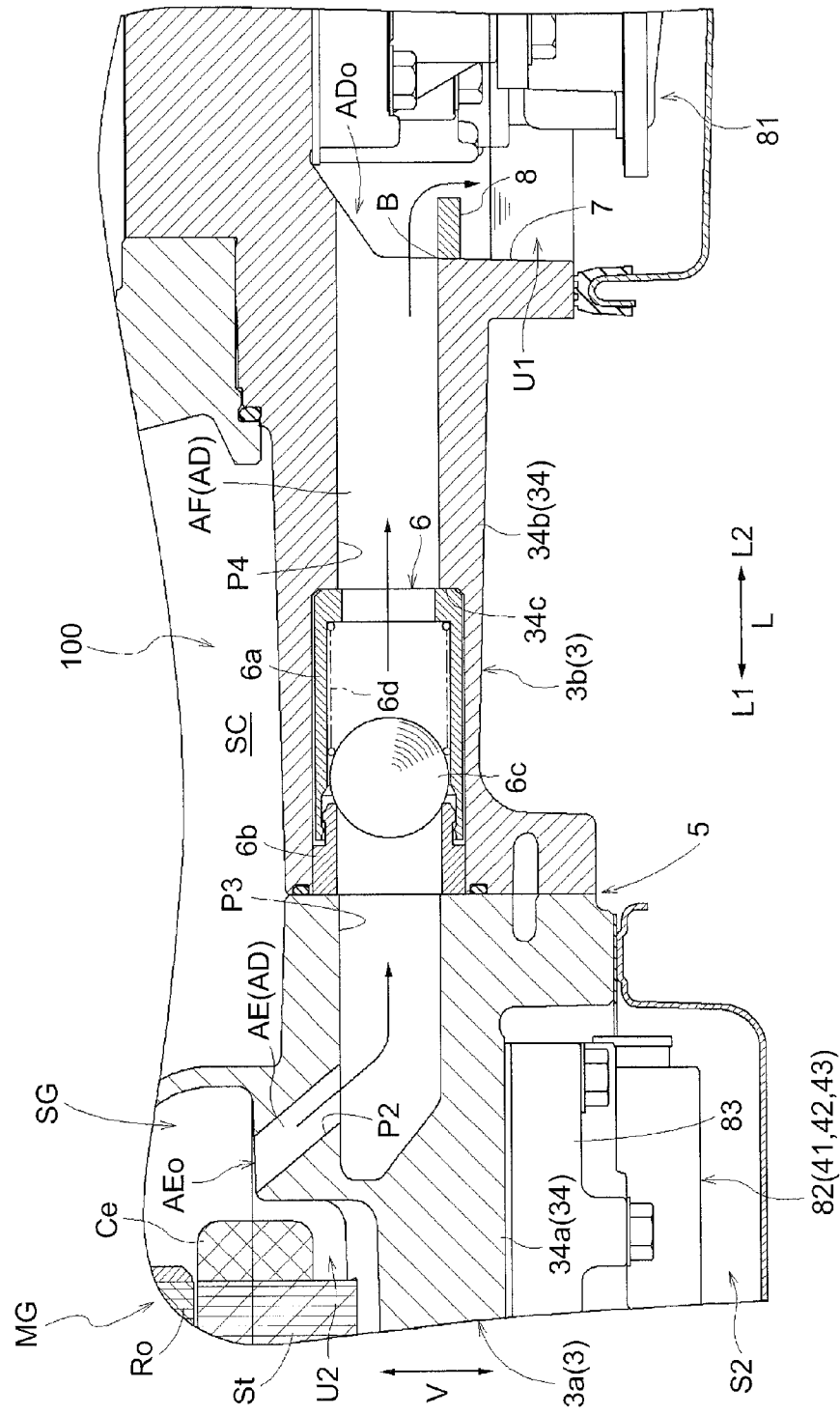
FIG. 7 is a partial sectional view of a vehicle drive device according to another embodiment of the present invention.

(1) The above embodiment is described with respect to an example in which the flow restricting mechanism 100 is formed by the structure in which the second opening AEo is located above the first opening ADo. However, embodiments of the present invention are not limited to this. For example, as shown in FIG. 7, it is also one of preferred embodiments of the present invention that the flow restricting mechanism 100 be configured so as to include a flow direction restricting valve 6 and a protruding portion 8. FIG. 7 shows an example in which the flow restricting mechanism 100 includes all of the structure in which the second opening AEo is located above the first opening ADo, the flow direction restricting valve 6, and the protruding portion 8. However, it is also possible that the second opening AEo is located at the same height as or below the first opening ADo and the flow restricting mechanism 100 includes one or both of the flow direction restricting valve 6 and the protruding portion 8. The discharge oil passage AD may not be provided with the flow restricting mechanism 100.

The configuration of FIG. 7 is described specifically. The flow direction restricting valve 6 is configured as a valve that switches from a closed state to an open state according to the oil pressure from the second oil storage portion U2 side. Specifically, the flow direction restricting valve 6 is a check valve provided in the first discharge oil passage AF and including a spherical body 6*c*, a guide member 6*a* that guides movement of the spherical body 6*c*, a cylindrical member 6*b* that functions to retain the guide member 6*a*, and a spherical body biasing member 6*d* that biases the spherical body 6*c* toward the cylindrical member 6*b* in the axial direction L. The guide member 6*a* is placed so as to be fitted on the inner peripheral surface of the fourth hole P4 by clearance fit, and to contact such a stepped surface of a step portion 34*c* formed in a second peripheral wall 34*b* that faces the axial first direction L1. The cylindrical member 6*b* is placed so as to be fitted on the inner peripheral surface of the fourth hole P4 by interference fit (press fit).

In the state where the spherical body 6*c* is not subjected to an oil pressure or in the state where the spherical body 6*c* is subjected to an oil pressure from the first oil storage portion U1 side, the spherical body 6*c* biased in the first axial direction L1 by the spherical body biasing member 6*d* contacts (closely contacts) a seat portion formed at the axial second direction L2-side end of the cylindrical member 6*b*, and the flow direction restricting valve 6 switches to the closed state. On the other hand, if the spherical body 6*c* is subjected to an oil pressure from the second oil storage portion U2 side and the oil pressure exceeds a predetermined value, the spherical body 6*c* moves in the axial second direction L2 against the biasing force of the spherical body biasing member 6*d*, and the flow direction restricting valve 6 switches from the closed state to the open state. At this time, oil flows in the axial second direction L2 through a recess (not shown) that is formed in the inner peripheral surface of the guide member 6*a* so as to be recessed radially outward, etc.

The protruding portion 8 is formed so as to protrude from the inner wall surface of a part of the wall 7, and the part is located below the lower end B of the first opening ADo. As described above, the wall 7 is a wall having the first opening ADo formed therein. In the example shown in FIG. 7, the protruding portion 8 is formed so as to extend parallel to the axial direction L from the inner wall surface of the wall 7 in the axial second direction L2. The upper surface of the protruding portion 8 is formed so as to be located at the same height as the lower end B of the first opening ADo. In this example, the first opening ADo is formed so that its upper end is located on the axial second direction L2 side with respect to its lower end, and the protruding portion 8 is formed so that its axial second direction L2-side end (its distal end) is located at the same position in the axial direction L as the upper end of the first opening ADo. The protruding portion 8 may be formed integrally with the case 3, or may be formed as a separate member from the case 3.

Although detailed description is omitted, the protruding portion 8 may have, e.g., a linear shape extending in the horizontal direction or an arc shape extending along the opening edge of the first opening ADo as viewed in the axial direction L. The protruding portion 8 is preferably formed so that the range in the horizontal direction in which the protruding portion 8 is provided includes the entire range in the horizontal direction in which the first opening ADo is provided, as viewed in the axial direction L, in order to sufficiently suppress entry of oil in the first oil storage portion U1 into the discharge oil passage AD via the first opening ADo.

(2) The example shown in FIG. 7 is described with respect to an example in which the flow direction restricting valve 6 is formed as a valve that switches from a closed state to an open state according to the oil pressure from the second oil storage portion U2 side. However, embodiments of the present invention are not limited to this. A valve that switches from an open state to a closed state according to the oil pressure from the first oil storage portion U1 side may be used as the flow direction restricting valve 6. Such a valve may be, e.g., the flow direction restricting valve 6 of FIG. 7 having the spherical body biasing member 6*d* removed therefrom. In this case, in the state where the spherical body 6*c* is not subjected to an oil pressure or in the state where the spherical body 6*c* is subjected to an oil pressure from the second oil storage portion U2 side, the spherical body 6*c* does not closely contact the seat portion formed at the axial second direction L2-side end of the cylindrical member 6*b*, and therefore the flow direction restricting valve 6 is in the open state. On the other hand, if the cylindrical body 6*c* is subjected to an oil pressure from the first oil storage portion U1 side, and this oil pressure exceeds a predetermined value, the spherical body 6*c* pressed in the axial first direction L1 by this oil pressure closely contacts the seat portion, and the flow direction restricting valve 6 switches from the open state to the closed state.

(3) The above embodiment is described with respect to an example in which oil discharged from the hydraulic pump 9 is supplied to the second hydraulic control device 82 via the first hydraulic control device 81 and the third oil passage A3. However, embodiments of the present invention are not limited to this. The second hydraulic control device 82 may have a line pressure control valve, and oil discharged from the hydraulic pump 9 may be directly supplied to the second hydraulic control device 82 without via the first hydraulic control device 81. The above embodiment is described with respect to an example in which the vehicle drive device 1 includes the second hydraulic control device 82 separately from the first hydraulic control device 81. However, the vehicle drive device 1 may not include the second hydraulic control device 82 and the second accommodating space S2, and may include only the first hydraulic control device 81. In this case, the oil pressure controlled by the first hydraulic control device 81 is supplied to the first clutch C1.

(4) The above embodiment is described with respect to an example in which oil discharged from the oil discharge port of the second hydraulic control device 82 is discharged to the second oil storage portion U2 and is then discharged to the first oil storage portion U1 via the discharge oil passage AD that allows the rotating electrical machine accommodating space SG to communicate with the first oil storage portion U1. However, embodiments of the present invention are not limited to this. Oil discharged from the oil discharge port of the second hydraulic control device 82 may be discharged to the first oil storage portion U1 via an oil passage separate from the discharge oil passage AD. This configuration may be used in the case where, e.g., the second hydraulic control device 82 is placed above the lower end of the first hydraulic control device 81. In this case, oil may be caused to flow in the separate oil passage by using not only gravity acting on the oil, but also, e.g., the discharge pressure of the second hydraulic control device 82.

(5) The above embodiment is described with respect to an example in which the second hydraulic control device 82 is fixed to the lower part of the case 3 (in this example, the first case portion 3a). However, embodiments of the present invention are not limited to this. For example, the second hydraulic control device 82 may be fixed to a side surface portion of the peripheral wall 34 of the case 3 (a part of the outer peripheral portion of the peripheral wall 34 which has a surface facing the horizontal direction). In this case, the second accommodating space S2 can be formed by the first case portion 3a and a side cover that covers the side surface portion of the case 3 to which the second hydraulic control device 82 is fixed, instead of the first case portion 3a and the second oil pan 12. In this case, it is preferable that at least a part of the electromagnetic portion of the first hydraulic control valve 41 be located below the oil level and the oil discharge port of the second hydraulic control device 82 (specifically, a part of the oil discharge port which opens to the outside of the second hydraulic control device 82) be located above the oil level. This configuration allows the electromagnetic portion to be cooled, and can suppress oil discharge resistance in the oil discharge port. The second hydraulic control device 82 may be fixed to the upper part of the peripheral wall 34 of the case 3 (a part of the outer peripheral portion of the peripheral wall 34 which has a surface facing upward).

(6) The above embodiment is described with respect to an example in which the second hydraulic control device 82 is positioned so as to have a portion overlapping the rotating electrical machine MG as viewed in the radial direction of the rotating electrical machine MG. However, embodiments of the present invention are not limited to this. The second hydraulic control device 82 may be placed at a different position from the rotating electrical machine MG in the axial direction of the rotating electrical machine MG so as not to have a portion overlapping the rotating electrical machine MG as viewed in the radial direction of the rotating electrical machine MG (7) The above embodiment is described with respect to an example in which the second hydraulic control device 82 is positioned so as to have a portion overlapping the first clutch C1 as viewed in the radial direction of the first clutch C1. However, embodiments of the present invention are not limited to this. The second hydraulic control device 82 may be placed at a different position from the first clutch C1 in the axial direction of the first clutch C1 so as not to have a portion overlapping the first clutch C1 as viewed in the radial direction of the first clutch C1. The above embodiment is described with respect to an example in which the vehicle drive device 1 includes the first clutch C1. However, the vehicle drive device 1 may not include the first clutch C1, and may be configured so that the input shaft I and the rotating electrical machine MG are drivingly coupled together so as to always rotate in cooperation with each other (e.g., rotate together). The vehicle drive device 1 may not include the first clutch C1 and the input shaft I, and the vehicle drive device 1 may use only the torque of the rotating electrical machine MG to move the vehicle.

(8) The above embodiment is described with respect to an example in which a part of the rotating electrical machine accommodating space SG forms the second oil storage portion U2 provided so as to communicate with the rotating electrical machine accommodating space SG. However, embodiments of the present invention are not limited to this. The second oil storage portion U2 may be formed in a space that is located below the rotating electrical machine accommodating space SG and that is formed on the radially outward direction R2 side with respect to the first peripheral wall 34a.

(9) The above embodiment is described with respect to an example in which the case 3 can be divided into the first case portion 3a that forms the rotating electrical machine accommodating space SG, and the second case portion 3b that forms the speed change mechanism accommodating space SM. However, embodiments of the present invention are not limited to this. A part of the case 3 where the case 3 can be divided can be changed as appropriate.

(10) The above embodiment is described with respect to an example in which the rotating electrical machine MG, the torque converter TC, and the speed change mechanism TM are arranged in this order from the axial first direction L1 side to the axial second direction L2 side. However, embodiments of the present invention are not limited to this. The torque converter TC, the rotating electrical machine MG, and the speed change mechanism TM may be arranged in this order from the axial first direction L1 side to the axial second direction L2 side. The above embodiment is described with respect to an example in which all of the rotating electrical machine MG, the torque converter TC, and the first clutch C1 are arranged on the axial first direction L1 side with respect to the speed change mechanism TM. However, at least one of the rotating electrical machine MG, the torque converter TC, and the first clutch C1 may be placed on the axial second direction L2 side with respect to the speed change mechanism TM.

(11) The above embodiment is described with respect to an example in which oil supplied from the second hydraulic control device 82 to the circulating oil pressure chamber H2 of the first clutch C1 is supplied to the rotating electrical machine MG after being discharged from the circulating oil pressure chamber H2. However, embodiments of the present invention are not limited to this. The oil pressure controlled by the first hydraulic control device 81 or the second hydraulic control device 82 may be supplied to the rotating electrical machine MG via an oil passage provided separately from the second oil passage A2, without via the first clutch C1. In this case, no oil pressure may be supplied to the circulating oil pressure chamber H2 of the first clutch C1, and the oil pressure controlled by the second hydraulic control device 82 may be supplied only to the hydraulic oil pressure chamber H1 of the first clutch C1.

(12) The above embodiment is described with respect to an example in which the vehicle drive device 1 has a single axis configuration, and all of the input shaft I, the first clutch C1, the rotating electrical machine MG, the torque converter TC, the intermediate shaft M, the speed change mechanism TM, and the output shaft O are arranged on the same axis. However, embodiments of the present invention are not limited to this. The vehicle drive device 1 may be configured as a drive device having a multi-axis configuration in which at least one of the input shaft I, the first clutch C1, the rotating electrical machine MG, the torque converter TC, the intermediate shaft M, and the output shaft O is placed on an axis different from that of the speed change mechanism TM. Such a drive device having a multi-axis configuration is preferable in the case where the vehicle drive device 1 further includes a counter gear mechanism, and such a configuration including the counter gear mechanism is suitable for being mounted on front engine front drive (FF) vehicles.

(13) The above embodiment is described with respect to an example in which the oil pressure controlled by the first hydraulic control valve 41 of the second hydraulic control device 82 is directly supplied to the hydraulic oil pressure chamber H1 of the first clutch C1. However, embodiments of the present invention are not limited to this. The vehicle drive device 1 may include a hydraulic control valve (not shown) separate from the first hydraulic control valve 41 so that the oil pressure controlled (regulated) by the separate hydraulic control valve is supplied to the hydraulic oil pressure chamber H1 of the first clutch C1. In this case, it is preferable that the separate hydraulic control valve be operated by using the oil pressure controlled by the first hydraulic control valve 41 as a signal pressure and thus be used as a pressure regulating valve that regulates a line pressure, and this separate hydraulic control valve be provided in the second hydraulic control device 82.

(14) The above embodiment is described with respect to an example in which the first hydraulic control device accommodating space that accommodates the first hydraulic control device 81 is a space surrounded by the second case portion 3b and the first oil pan 11 that is attached to the lower part of the second case portion 3b. However, embodiments of the present invention are not limited to this. The first hydraulic control device accommodating space may be formed only by a part of the case 3 which is formed integrally with the second case portion 3b (e.g., may be formed in the peripheral wall of the second case portion 3b).

(15) The above embodiment is described with respect to an example in which the second accommodating space S2 that accommodates the second hydraulic control device 82 is a space surrounded by the first case portion 3a and the second oil pan 12 that is attached to the lower part of the first case portion 3a. However, embodiments of the present invention are not limited to this. The second accommodating space S2 may be formed only by a part of the case 3 which is formed integrally with the first case portion 3a (e.g., may be formed in the peripheral wall of the first case portion 3a).

(16) The above embodiment is described with respect to an example in which the vehicle drive device 1 includes the torque converter TC having a torque amplifying function as a fluid coupling. However, embodiments of the present invention are not limited to this. The vehicle drive device 1 may include a fluid coupling having no torque amplifying function instead of the torque converter TC, or the vehicle drive device 1 may not include any fluid coupling.

(7) Regarding other configurations as well, the embodiments disclosed in the specification are by way of example only in all respects, and embodiments of the present invention are not limited to them. That is, those configurations which are not described in the claims of the present application may be modified as appropriate without departing from the object of the present invention.

The present invention can be preferably used for vehicle drive devices that include a rotating electrical machine, a speed change mechanism provided in a power transmission path connecting the rotating electrical machine and wheels, and a case that forms at least a rotating electrical machine accommodating space that accommodates the rotating electrical machine and a speed change mechanism accommodating space that accommodates a speed change mechanism.

The invention claimed is:

1. A vehicle drive device, comprising:
a rotating electrical machine;
a speed change mechanism provided in a power transmission path connecting the rotating electrical machine and wheels;
a case that forms at least a rotating electrical machine accommodating space that accommodates the rotating electrical machine and a speed change mechanism accommodating space that accommodates the speed change mechanism;
a first oil storage portion provided so as to communicate with the speed change mechanism accommodating space, and capable of storing oil;
a hydraulic pump that supplies the oil in the first oil storage portion to the speed change mechanism and the rotating electrical machine;
a second oil storage portion provided so as to communicate with the rotating electrical machine accommodating space, and capable of storing oil; and
a discharge oil passage that discharges the oil in the second oil storage portion to the first oil storage portion, wherein
the discharge oil passage includes a first opening that opens toward the first oil storage portion, and
the first opening is provided so that its lower end is located above an oil level in the first oil storage portion during rotation of the hydraulic pump.

2. The vehicle drive device according to claim 1, wherein the discharge oil passage is provided with a flow restricting mechanism that restricts oil flow in a direction from the first oil storage portion to the second oil storage portion.

3. The vehicle drive device according to claim 2, wherein the discharge oil passage includes a second opening that opens into the second oil storage portion, and
the flow restricting mechanism includes a structure in which the second opening is located above the first opening.

4. The vehicle drive device according to claim 3, wherein the discharge oil passage includes a first oil passage extending in a horizontal direction from the first opening, and a second oil passage extending in a direction downward with respect to the horizontal direction from the second opening and communicating with the first oil passage.

5. The vehicle drive device according to claim 4, wherein the flow restricting mechanism includes a flow direction restricting valve that is either a valve that switches from a closed state to an open state according to an oil pressure from a second oil storage portion side or a valve that switches from the open state to the closed state according to an oil pressure from a first oil storage portion side.

6. The vehicle drive device according to claim 4, wherein the first oil storage portion has a wall having the first opening formed therein, and
the flow restricting mechanism includes a protruding portion protruding from an inner wall surface of a part of the wall, the part being located below the lower end of the first opening.

7. The vehicle drive device according to claim 4, wherein the rotating electrical machine and an input shaft of the speed change mechanism are arranged on a same axis.

8. The vehicle drive device according to claim 3, wherein the flow restricting mechanism includes a flow direction restricting valve that is either a valve that switches from a closed state to an open state according to an oil pressure from a second oil storage portion side or a valve that switches from the open state to the closed state according to an oil pressure from a first oil storage portion side.

9. The vehicle drive device according to claim 3, wherein the first oil storage portion has a wall having the first opening formed therein, and
the flow restricting mechanism includes a protruding portion protruding from an inner wall surface of a part of the wall, the part being located below the lower end of the first opening.

10. The vehicle drive device according to claim 3, wherein
the rotating electrical machine and an input shaft of the speed change mechanism are arranged on a same axis.

11. The vehicle drive device according to claim 3, wherein the first oil storage portion is formed below the speed change mechanism accommodating space, and the second oil storage portion is formed below the rotating electrical machine accommodating space.

12. The vehicle drive device according to claim 3, wherein
the oil supplied to the rotating electrical machine by the hydraulic pump is supplied to the second oil storage portion.

13. The vehicle drive device according to claim 2, wherein
the flow restricting mechanism includes a flow direction restricting valve that is either a valve that switches from a closed state to an open state according to an oil pressure from a second oil storage portion side or a valve that switches from the open state to the closed state according to an oil pressure from a first oil storage portion side.

14. The vehicle drive device according to claim 2, wherein
the rotating electrical machine and an input shaft of the speed change mechanism are arranged on a same axis.

15. The vehicle drive device according to claim 2, wherein
the first oil storage portion is formed below the speed change mechanism accommodating space, and the second oil storage portion is formed below the rotating electrical machine accommodating space.

16. The vehicle drive device according to claim 2, wherein
the oil supplied to the rotating electrical machine by the hydraulic pump is supplied to the second oil storage portion.

17. The vehicle drive device according to claim 1, wherein
the first oil storage portion has a wall having the first opening formed therein, and
the flow restricting mechanism includes a protruding portion protruding from an inner wall surface of a part of the wall, the part being located below the lower end of the first opening.

18. The vehicle drive device according to claim 1, wherein
the rotating electrical machine and an input shaft of the speed change mechanism are arranged on a same axis.

19. The vehicle drive device according to claim 1, wherein
the first oil storage portion is formed below the speed change mechanism accommodating space, and the second oil storage portion is formed below the rotating electrical machine accommodating space.

20. The vehicle drive device according to claim 1, wherein
the oil supplied to the rotating electrical machine by the hydraulic pump is supplied to the second oil storage portion.

* * * * *